(12) United States Patent
Chen et al.

(10) Patent No.: US 8,544,657 B2
(45) Date of Patent: Oct. 1, 2013

(54) APPARATUS AND METHOD FOR REMOVING CONTAMINANTS FROM INDUSTRIAL FLUIDS

(75) Inventors: Ruijun Chen, Auburn, AL (US); William J. Martin, Lagrange, GA (US)

(73) Assignee: Kaydon Custom Filtration Corporation, LaGrange, GA (US)

( * ) Notice: Subject to any disclaimer, the term of this patent is extended or adjusted under 35 U.S.C. 154(b) by 612 days.

(21) Appl. No.: 12/765,283

(22) Filed: Apr. 22, 2010

(65) Prior Publication Data

US 2011/0259796 A1    Oct. 27, 2011

(51) Int. Cl.
| | |
|---|---|
| B01D 29/00 | (2006.01) |
| B01D 35/00 | (2006.01) |
| B01D 36/00 | (2006.01) |
| B01D 29/07 | (2006.01) |
| B01D 35/30 | (2006.01) |

(52) U.S. Cl.
USPC ........ 210/488; 210/295; 210/416.4; 210/457; 210/483; 210/489; 210/490; 210/493.1; 210/DIG. 5; 210/484; 210/485

(58) Field of Classification Search
None
See application file for complete search history.

(56) References Cited

U.S. PATENT DOCUMENTS

| | | |
|---|---|---|
| 3,708,965 A | 1/1973 | Domnick |
| 4,102,785 A | 7/1978 | Head et al. |
| 4,130,487 A | 12/1978 | Hunter et al. |
| 4,244,820 A | 1/1981 | Hauk et al. |
| 4,588,500 A | 5/1986 | Sprenger et al. |
| 4,878,929 A | 11/1989 | Tofsland et al. |
| 5,443,724 A | 8/1995 | Williamson et al. |
| 6,187,073 B1 | 2/2001 | Gieseke et al. |
| 6,332,987 B1 | 12/2001 | Whitney et al. |
| 6,422,396 B1 | 7/2002 | Li et al. |
| 6,569,330 B1 | 5/2003 | Sprenger et al. |
| 6,648,147 B1 | 11/2003 | Lydon et al. |
| 6,702,941 B1 | 3/2004 | Haq et al. |
| 7,081,201 B2 | 7/2006 | Bassett et al. |
| 7,128,835 B1 | 10/2006 | Hundley et al. |
| 7,438,812 B2 * | 10/2008 | Denton et al. ............. 210/493.1 |
| 7,455,768 B2 | 11/2008 | Hundley et al. |
| 2002/0139746 A1 | 10/2002 | Koslow |
| 2003/0006186 A1 | 1/2003 | Pulek et al. |
| 2005/0103701 A1 | 5/2005 | Bechtum et al. |
| 2006/0266693 A1 | 11/2006 | Yoshida et al. |
| 2007/0125700 A1 | 6/2007 | Ding et al. |
| 2008/0053888 A1 | 3/2008 | Ellis et al. |
| 2008/0061009 A1 | 3/2008 | Muse et al. |
| 2008/0105629 A1 | 5/2008 | Yang et al. |
| 2008/0110822 A1 | 5/2008 | Chung et al. |
| 2008/0217239 A1 | 9/2008 | Chen et al. |
| 2009/0014378 A1 | 1/2009 | Hundley et al. |
| 2009/0032475 A1 | 2/2009 | Ferrer et al. |

* cited by examiner

Primary Examiner — Benjamin Kurtz
(74) Attorney, Agent, or Firm — Price Heneveld LLP

(57) ABSTRACT

A filter system for removing contaminants from oil based industrial liquids and the like includes a support tube with a permeable sidewall through which the industrial liquid flows in an inside out direction. A multilayer coalescence media surrounds the support tube, and includes at least one layer of a non-woven fibrous material that is partially wettable by the dispersed water in the industrial liquid, and commences coalescence of the same to form small primary water droplets, and at least one sheet of a precisely woven monofilament fabric stacked on the downstream side of the non-woven material. The woven fabric is substantially wettable by the dispersed water, and has a fixed open mesh with uniformly sized and spaced apart pore openings which continue to coalesce the primary water droplets into large water drops which fall from the filter for collection along the bottom of the apparatus.

4 Claims, 11 Drawing Sheets

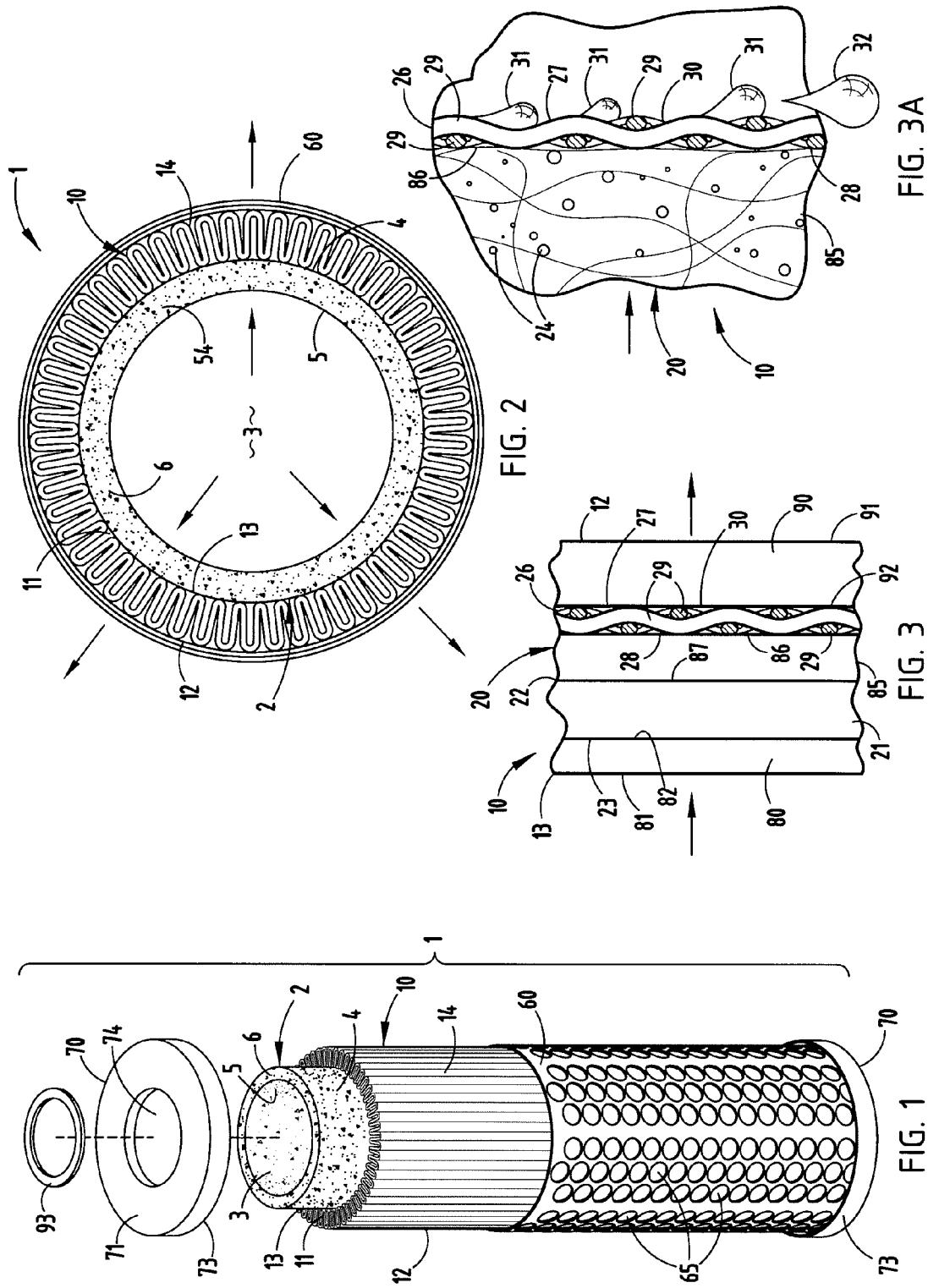

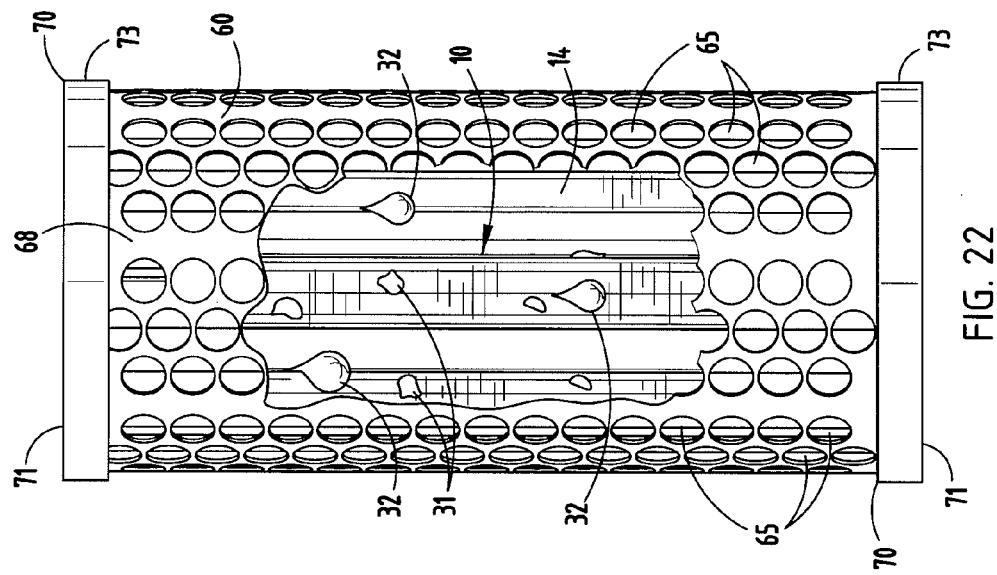
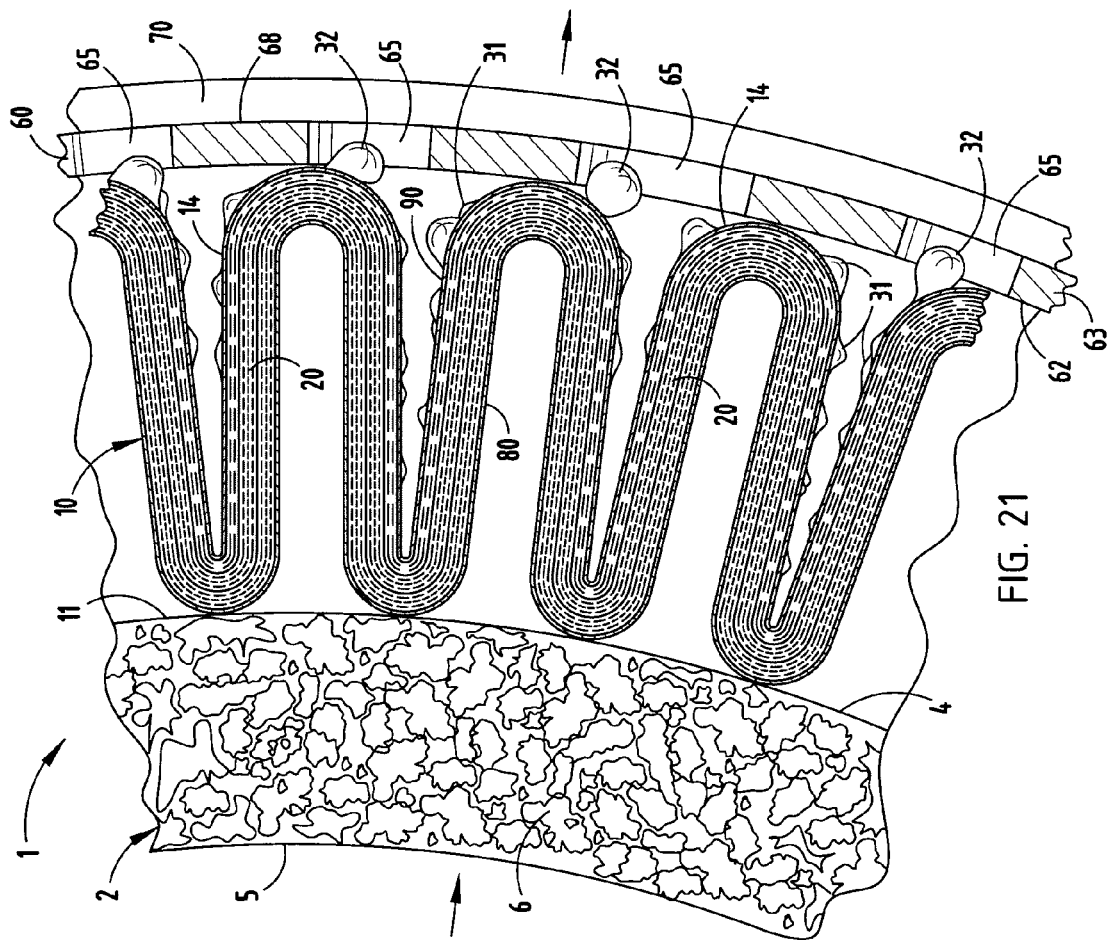
FIG. 21
FIG. 22

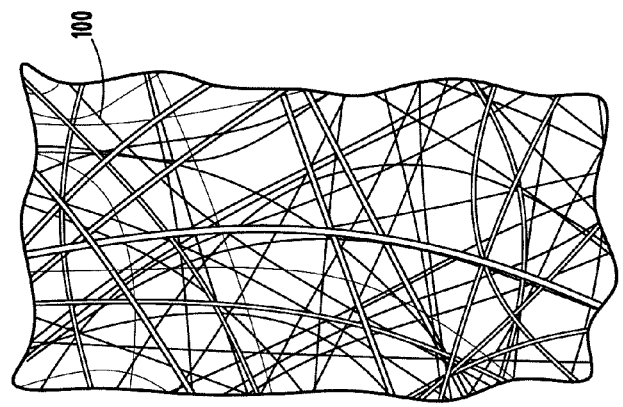
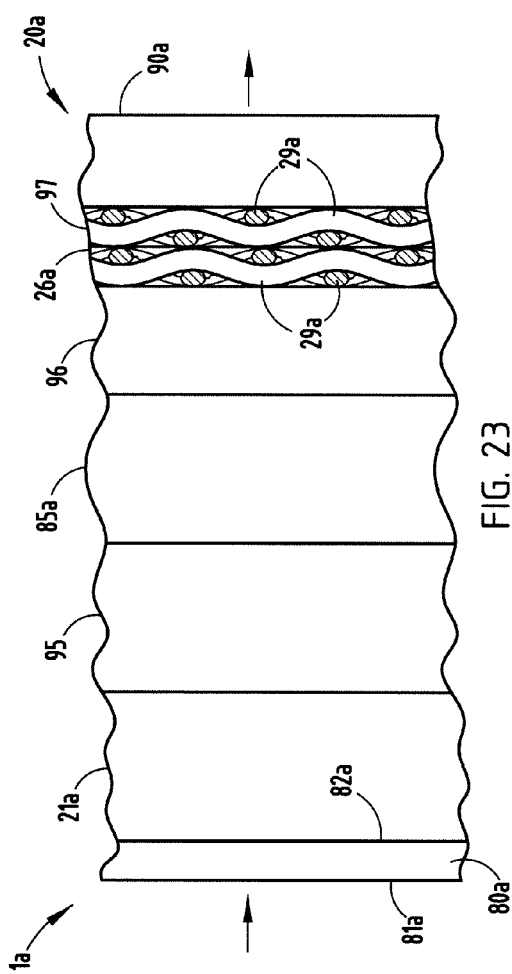
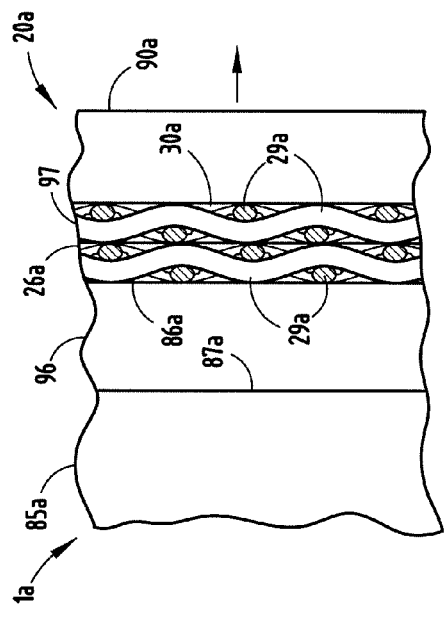

APPARATUS AND METHOD FOR REMOVING CONTAMINANTS FROM INDUSTRIAL FLUIDS

BACKGROUND OF THE INVENTION

The present invention relates to filtration systems for removing contaminants from industrial fluids and the like, and in particular to a liquid coalescer media and method.

Filtration systems for industrial fluids are generally well known in the art. For example, contaminants, including solid particles and dispersed contaminant liquid water particles, must be removed from oil based industrial liquids, such as petrochemicals in the nature of gasoline, diesel fuel, jet fuel, gear oil, hydraulic fluid, lubricating oils, etc., organic and/or vegetable oils, bio-fuels, petrodiesel-biodiesel fuel blends, etc., as well as synthetic based lubricants and the like, to ensure proper long term operation and protection of the associated equipment. In the case of internal combustion engines, turbines, turbine driven equipment and other similar machines, to achieve long term predicable and profitable performance, both the fuel and the lubrication must be free from water contaminant and also free from solid particles. In the case of lubricants, oil conditioning systems are used in preventing lubricant oxidation and viscosity breakdown which set the stage for equipment failure due primarily to metal to metal contact between moving parts of the machinery. Preferably, filtration and related conditioning systems quickly and efficiently remove harmful water, particulate and other contaminants from fuels, lubrication oils, and other similar industrial fluids.

The separation of liquid water droplet dispersions from oil based industrial fluids is becoming increasingly important in today's technology, whether it is achieved by chemical extraction processing, effluent treatment, purification of fuels and lubricants, or emerging bio-fuel processing. The need to remove free water from such liquids is particularly stringent with liquid hydrocarbon fuel and biodiesel, which are often combined with rich additives, since even a small water content in these fuels results in corrosion of engine components and promotes microbiological growth in the fuel tank. Biodiesel fuels in particular tend to collect water quickly, especially in warmer environments. Surfactants are often added to such fuels to disperse any emulsified water therein into fine particles in an effort to promote proper engine performance. However, such surfactants make it very difficult to separate the water from the fuel. The presence of water alters the ability of the fuel to be effectively filtered, due to its physical property changes, and also accelerates fatigue wear in highly stressed mechanical components. All these factors clearly adversely impact the durability and performance of the engine system. In general, contaminated fuels harm equipment and interrupt or slow down process operations which results in expensive downtime, reduced efficiency and increased costs. For these reasons, current trade standards limit the maximum water content in both petrodiesel and biodiesel fuels to 500.0 ppm, while European Union diesel specifications further reduce the maximum water content in petrodiesel fuel and some biodiesel blends to 200.0 ppm.

The presence of a large water content in fuels treated with surfactants and/or additives disarms conventional coalescer elements in two ways:

1. Surfactants reduce the interfacial tension between wetted fibrous coalescer media surfaces and attached water droplets, resulting in detachment problems of water droplets on the fibrous coalescence media, and reduced coalescence effectiveness; and 2. Large water content in these fuels results in clogging the fibrous coalescer element, which ruins both coalescer effectiveness and efficiency.

Some prior filtration systems for lubricating oils, such as that disclosed in U.S. Pat. No. 6,422,396, use a multistep filtration process, wherein a separate particle filter element is positioned upstream of a standalone coalescer element to filter solid particles out of the lubricating oil before the dispersed water contaminant is removed from the partially filtered oil. While such devices are generally effective for lubricating oils, they are not suitable for use with fuels, and have a rather complicated construction, provide significant resistance to fuel flow through the system, and do not always remove enough free and emulsified water from the liquid to meet the ever increasing specifications required by modern industrial equipment.

Hence, a coalescer element having an uncomplicated construction, with reduced resistance to fluid flow and increased effectiveness and efficiency in removing in a single pass even large quantities of dispersed contaminant liquid water particles from oil based industrial liquids, including those treated with surfactants or the like, would clearly be beneficial.

SUMMARY OF THE INVENTION

One aspect of the present invention is an apparatus for removing contaminants from liquid fuels, lubricants and other oil based industrial liquids of the type having a particulate filter configured for removing solid contaminants from a selected oil based industrial liquid, a water coalescer positioned downstream of the particulate filter and configured for removing dispersed contaminant water particles from the oil based industrial liquid, and a pump configured for sequentially flowing the oil based industrial liquid through the particulate filter and the water coalescer. An improved liquid/liquid coalescer element for the water coalescer includes a porous support tube having a hollow interior, a radially oriented exterior surface, a radially oriented interior surface, and a permeable sidewall through which an oil based industrial liquid flows in an inside out direction from the interior surface to the exterior surface. A coalescer element also includes a coalescer pleat block having a hollow interior, a radially oriented exterior surface, and a radially oriented interior surface overlying the exterior surface of the support tube, and includes a plurality of individual pleats arranged side-by-side and formed from an integrated, multilayer coalescer media. The coalescer media comprises at least one layer of non-woven fibrous material that is partially wettable by the dispersed contaminant liquid water particles in the oil based industrial liquid, and has a downstream face, an oppositely disposed upstream face disposed adjacent to the exterior surface of the support tube, and a predetermined thickness, mean flow pore size, hydrophilic level and stiffness sufficient to commence coalescence of the dispersed contaminant liquid water particles in the incoming oil based industrial fluid as the same flows therethrough and thereby form a plurality of relatively small primary water droplets. The coalescence media also includes at least one sheet of precisely woven monofilament fabric that is substantially completely wettable by the dispersed contaminant liquid water particles in the oil based industrial liquid, and has a downstream face, an oppositely disposed upstream face abuttingly overlying the downstream face of the layer of non-woven fibrous material, and a fixed open mesh with uniformly sized and spaced apart pore openings, and a predetermined mean flow pore size and hydrophilic level sufficient to continue coalescence of the dispersed contaminant water particles in the incoming oil based industrial liquid in a manner such that, as the oil based industrial liquid passes through the pleat block, the primary water droplets flow in a generally uniform pattern from the downstream face of the layer of non-woven fibrous material onto the upstream face of the sheet of precisely woven monofilament fiber, attach to the monofilament fibers of the open mesh due to strong droplet wettability over the same, and while so attached, experience bidirectional hydrodynamic interactions with adjacent primary water droplets and the oil based industrial liquid flowing therethrough which cause the primary water droplets to deform and reflow on the sheet of precisely woven monofilament fiber, thereby growing the same in size into relatively large secondary water droplets, which are in turn distributed in a generally homogeneous spatial relationship across the downstream face of the sheet of precisely woven monofilament fiber, and continue to grow in size thereon through reflowing and/or colliding with other primary and/or secondary water droplets into relatively large water drops having a size sufficient that the viscous drag forces of the oil based industrial liquid flowing through the coalescer element cause the large water drops to release from the downstream face of the precisely woven monofilament fabric and fall downwardly under gravitational forces from the pleat block for collection adjacent a bottom portion of the coalescer element.

Another aspect of the present invention is a liquid/liquid coalescer element for removing dispersed contaminant liquid water particles from liquid fuels, lubricants and other oil based industrial liquids. The coalescer element includes a porous support tube having a hollow interior, a radially oriented exterior surface, a radially oriented interior surface, and a permeable sidewall through which an oil based industrial liquid flows in an inside out direction from the interior surface to the exterior surface. The coalescer element also includes a coalescer pleat block having a hollow interior, a radially oriented exterior surface, a radially oriented interior surface overlying the exterior surface of the support tube, and a plurality of individual pleats arranged side-by-side and formed from an integrated, multilayer coalescer media. The coalescer media comprises at least one layer of non-woven fibrous material that is partially wettable by the dispersed contaminant liquid water particles in the oil based industrial liquid, and has a downstream face, an oppositely disposed upstream face disposed adjacent to the exterior surface of the support tube, and a predetermined thickness, mean flow pore size, hydrophilic level and stiffness sufficient to commence coalescence of the dispersed contaminant liquid water particles in the incoming oil based industrial fluid as the same flows therethrough and thereby form a plurality of relatively small primary water droplets. The coalescence media also includes at least one sheet of precisely woven monofilament fabric that is substantially completely wettable by the dispersed contaminant liquid water particles in the oil based industrial fluid, and has a downstream face, an oppositely disposed upstream face abuttingly overlying the downstream face of the layer of non-woven fibrous material, and a fixed open mesh with uniformly sized and spaced apart pore openings, and a predetermined mean flow pore size and hydrophilic level sufficient to continue coalescence of the dispersed contaminant liquid water particles in the incoming oil based industrial liquid in a manner such that, as the oil based industrial liquid passes through the pleat block, the primary water droplets flow in a generally uniform pattern from the downstream face of the layer of non-woven fibrous material onto the upstream face of the sheet of precisely woven monofilament fiber, attach to the monofilament fibers of the open mesh due to strong droplet wettability over the same, and while so attached, experience bidirectional hydrodynamic interactions with adjacent primary water droplets and the oil based industrial liquid flowing therethrough which cause the primary water droplets to deform and reflow on the sheet of precisely woven monofilament fiber, thereby growing the same in size into relatively large secondary water droplets, which are in turn distributed in a generally homogeneous spatial relationship across the downstream face of the sheet of precisely woven monofilament fiber, and continue to grow in size thereon through reflowing and/or colliding with other primary and/or secondary water droplets into relatively large water drops having a size sufficient that the viscous drag forces of the oil based industrial liquid flowing through the coalescer element cause the large water drops to release from the downstream face of the precisely woven monofilament fabric and fall downwardly under gravitational forces from the pleat block for collection adjacent a bottom portion of the coalescer element.

Yet another aspect of the present invention is a method for removing contaminants from liquid fuels, lubricants and other oil based industrial liquids. The method includes filtering solid particles from a selected oil based industrial liquid, and after the solid particle filtering step, coalescing dispersed contaminant liquid water particles from the oil based industrial fluid. The coalescing step includes forming a porous support tube with a hollow interior, a radially oriented exterior surface, a radially oriented interior surface and a permeable sidewall through which the oil based industrial liquid flows in an inside out direction from the interior surface to the exterior surface. The method also includes forming a coalescer pleat block with a hollow interior, a radially oriented exterior surface, and a radially oriented interior surface shaped to overlie the exterior surface of the support tube. The pleat block forming step includes providing at least one layer of a non-woven fibrous material that is partially wettable by the dispersed contaminant liquid water particles in the oil based industrial liquid, with an upstream face, an oppositely disposed downstream face, and a predetermined thickness, mean flow pore size, hydrophilic level and stiffness sufficient to commence coalescence of the dispersed contaminant liquid water particles in the incoming oil based industrial liquid as the same flows therethrough. The coalescer pleat block forming step also includes providing at least one sheet of precisely woven monofilament fabric that is substantially completely wettable by the dispersed contaminant liquid water particles in the oil based industrial liquid, with a downstream face, an oppositely disposed upstream face, and a fixed open mesh with uniformly sized and spaced apart pore openings, and a predetermined mean flow pore size and a hydrophilic level sufficient to continue coalescence of the dispersed contaminant liquid water particles in the incoming oil based industrial liquid. The method further includes the steps of positioning the upstream face of the sheet of precisely woven monofilament fabric abuttingly over the downstream face of the layer of non-woven fibrous material in a tightly stacked relationship, and pleating the stacked layer of non-woven fibrous material and sheet of precisely woven monofilament fabric to securely interconnect the same to form a media strip with a plurality of individual pleats arranged in a side-by-side relationship. The method also includes the steps of cutting the media strip to a predetermined length, forming the cut media strip into a predetermined shape similar to the exterior surface of the support tube to define the coalescer pleat block, and positioning the coalescer pleat block around the support tube with the upstream face of the layer of non-woven fibrous material disposed adjacent to the exterior surface of the support tube. The method also includes the steps of sequentially flowing the oil based industrial liquid through the porous support tube and the pleat block in an inside out direction, thereby forming relatively small primary water droplets in the layer of non-woven fibrous material, and flowing the same in a generally uniform pattern from the downstream face of the layer of non-woven fibrous material onto the upstream face of the sheet of precisely woven monofilament fibers, attaching the same to the monofilament fibers of the open mesh due to strong droplet wettability over the same, and while so attached, experiencing bidirectional hydrodynamic interactions with adjacent primary water droplets and the oil based industrial liquid flowing therethrough causing the primary water droplets to deform and reflow on the sheet of precisely woven monofilament fiber, thereby growing the same in size into relatively large secondary water droplets, which in turn are dispersed in a generally homogeneous spatial pattern across the downstream face of the sheet of precisely woven monofilament fiber, and continue growing in size thereon through reflowing and colliding with other primary and/or secondary water droplets into relatively large water drops having a size sufficient that the viscous drag forces of the oil based industrial liquid flowing through the coalescer element cause the large water drops to release from the downstream face of the precisely woven monofilament fabric and fall downwardly under gravitational forces from the pleat block to the bottom portion of the coalescer element. The method also includes the steps of collecting the large water drops at the bottom portion of the coalescer element and removing the same from the oil based industrial liquid for disposal.

Yet another aspect of the present invention is a method for removing dispersed contaminant liquid water particles from liquid fuel, lubricants and other oil based industrial liquids. The method includes forming a porous support tube with a hollow interior, a radially oriented exterior surface, a radially oriented interior surface, and a permeable sidewall through which an oil based industrial liquid flows in an inside out direction from the interior surface to the exterior surface. The method also includes forming a coalescer pleat block with a hollow interior, a radially oriented exterior surface, and a radially oriented interior surface shaped to overlie the exterior surface of the support tube. The pleat block forming step includes providing at least one layer of a non-woven fibrous material that is partially wettable by the dispersed contaminant liquid water particles in the oil based industrial liquid, with an upstream face, an oppositely disposed downstream face, and predetermined thickness, mean flow pore size, hydrophilic level and stiffness sufficient to commence coalescence of the dispersed contaminant liquid water particles in the incoming oil based industrial liquid as the same flows therethrough. The coalescer pleat block forming step also includes providing at least one sheet of precisely woven monofilament fabric that is substantially completely wettable by the dispersed contaminant liquid water particles in the oil based industrial liquid, with a downstream face, an oppositely disposed upstream face, and a fixed open mesh with uniformly sized and spaced apart pore openings, and a predetermined mean flow pore size and hydrophilic level sufficient to continue coalescence of the dispersed contaminant liquid water particles in the incoming oil based industrial liquid. The method further includes the steps of positioning the upstream face of the sheet of precisely woven monofilament fabric abuttingly over the downstream face of the layer of non-woven fibrous material in a tightly stacked relationship, and pleating the stacked layer of non-woven fibrous material and sheet of precisely woven monofilament fabric to securely interconnect the same and form a media strip with a plurality of individual pleats arranged in a side-by-side relationship. The method also includes the steps of cutting the media strip to a predetermined length, forming the cut media strip into a predetermined shape similar to the exterior surface of the support tube to define the coalescer pleat block, and positioning the coalescer pleat block around the support tube with the upstream face of the layer of non-woven fibrous material disposed adjacent to the exterior surface of the support tube. The method also includes the steps of sequentially flowing the oil based industrial liquid through the porous support tube and the pleat block in an inside out direction, thereby forming relatively small primary water droplets in the layer of non-woven fibrous material, and flowing the same in a generally uniform pattern from the downstream face of the layer of non-woven fibrous material onto the upstream face of the sheet of precisely woven monofilament fiber, attaching the same to the monofilament fibers of the open mesh due to strong droplet wettability over the same, and while so attached, experiencing bidirectional hydrodynamic interactions with adjacent primary water droplets and the oil based industrial liquid flowing therethrough causing the primary water droplets to deform and reflow on the sheet of precisely woven monofilament fiber, thereby growing the same in size into relatively large secondary water droplets, which in turn are dispersed in a generally homogeneous spatial relationship across the downstream face of the sheet of precisely woven monofilament fiber, and continue growing in size thereon through reflowing and/or colliding with other primary and/or secondary water droplets into relatively large water drops having a size sufficient that the viscous drag forces of the oil based industrial liquid flowing through the coalescer element cause the large water drops to release from the downstream face of the precisely woven monofilament fabric and fall downwardly under gravitational forces from the pleat block to a bottom portion of the coalescer element. The method also includes the steps of collecting the large water drops at the bottom portion of the coalescer element and removing the same from the oil based industrial liquid for disposal.

Yet another aspect of the present invention is a liquid/liquid coalescer element for removing dispersed contaminant liquid water particles from liquid fuels, lubricants and other oil based industrial liquids. The coalescer element comprises a support tube having a hollow interior, a radially oriented exterior surface, a radially oriented interior surface, and a permeable sidewall through which an oil based industrial liquid flows in an inside out direction from the interior surface to the exterior surface. The coalescer element also includes a coalescer cartridge having a hollow interior, a radially oriented exterior surface, a radially oriented interior surface overlying the exterior surface of the support tube, and an integrated multilayer coalescence media. The coalescence media comprises at least one layer of non-woven fibrous material that is partially wettable by the dispersed contaminant liquid water particles in the oil based industrial liquid, and having a downstream face, an oppositely disposed upstream face disposed adjacent to the exterior surface of the support tube, and a predetermined thickness, mean flow pore size, hydrophilic level and stiffness sufficient to commence coalescence of the dispersed contaminant liquid water particles in the incoming oil based industrial fluid as the same flows therethrough and thereby form a plurality of relatively small primary water droplets. The coalescence media also includes at least one sheet of precisely woven monofilament fabric that is substantially wettable by the dispersed contaminant liquid water particles in the oil based industrial fluid, and having a downstream face, an oppositely disposed upstream face abuttingly overlying the downstream face of the layer of non-woven fibrous material, a fixed open mesh with uniformly sized and spaced apart pore openings, and a predetermined mean flow pore size and hydrophilic level sufficient to continue coalescence of the dispersed contaminant liquid water particles in the incoming oil based industrial liquid. The coalescer element also includes a rigid support jacket having a hollow interior in which the coalescer cartridge is closely received, a radially oriented interior surface abutting the downstream face of the sheet of precisely woven monofilament fabric and a perforate sidewall through which the oil based industrial liquid flows.

Yet another aspect of the present invention is an apparatus and method for removing contaminants from liquid fuels, lubricants and other oil based industrial liquid which include a unique coalescer element that is highly resistant to large water content in fuels, including those with surfactants, and is capable of efficiently and effectively removing the same from fuel. The coalescer element has a compact construction, and is capable of removing substantial quantities of dispersed water from the industrial liquid in a single flow pass through the coalescer element. The coalescer element has a durable, uncomplicated design that is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is an exploded, perspective view of a coalescer element embodying the present invention, wherein portions thereof have been broken away to reveal internal construction.

FIG. 2 is a lateral cross-sectional view of the coalescer element shown in FIG. 1.

FIG. 3 is an enlarged, cross-sectional view of a coalescence media portion of the coalescer element.

FIG. 3A is a further enlarged, partially diagrammatic, cross-sectional view of a section of the coalescence media shown in FIG. 3, with water droplets forming in the same.

FIG. 21 is a partially schematic, horizontal cross-sectional illustration of the coalescer element, with water droplets migrating radially therethrough to a downstream surface of the precisely woven monofilament fabric where the water droplets grow to a size sufficient to fall under gravity to a collection area.

FIG. 22 is a partially schematic, side elevational view of the coalescer element shown in FIG. 21, with portions thereof broken away to reveal internal construction and water droplet formation.

FIG. 23 is an enlarged, cross-sectional view of another embodiment of the present invention having an eight layer coalescence media.

FIG. 24 is an enlarged, cross-sectional view of the eight layer coalescence media shown in FIG. 23.

FIG. 25 is an enlarged plan view of an alternative non-woven fibrous material that may be used in the coalescer element.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
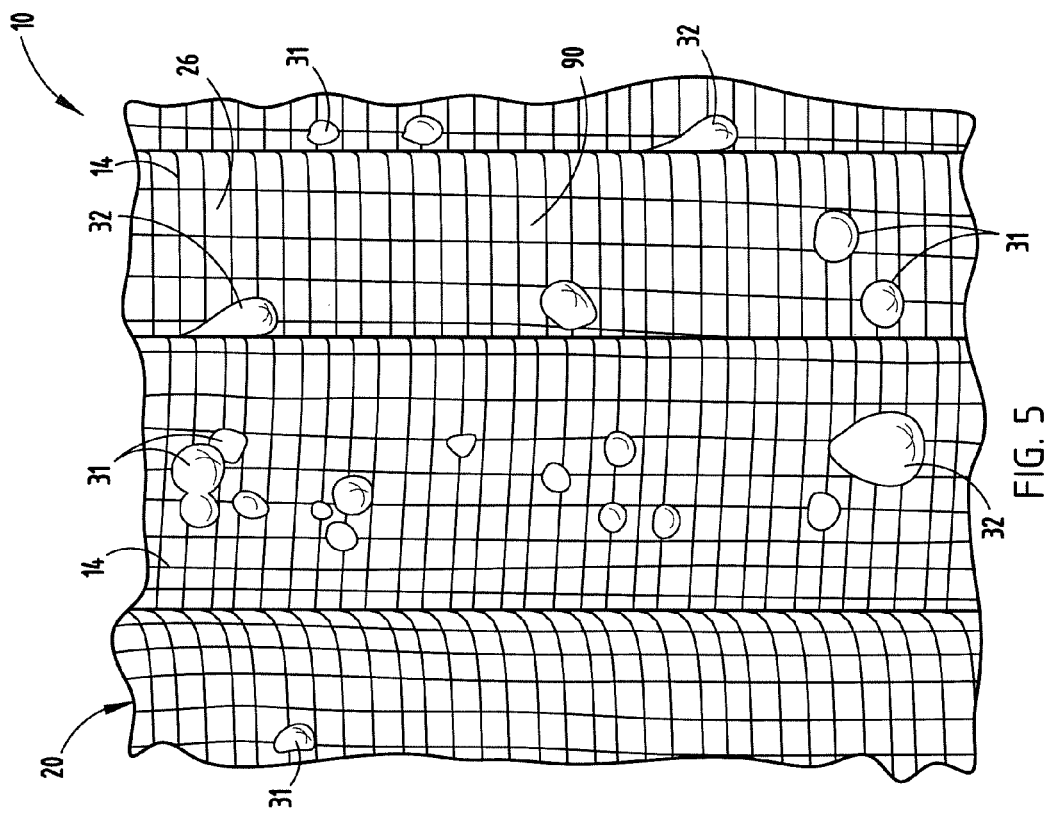
FIG. 4 is an enlarged, partially diagrammatic, perspective view of a section of the coalescence media, with water droplets forming on a downstream side thereof.
Figure 5:
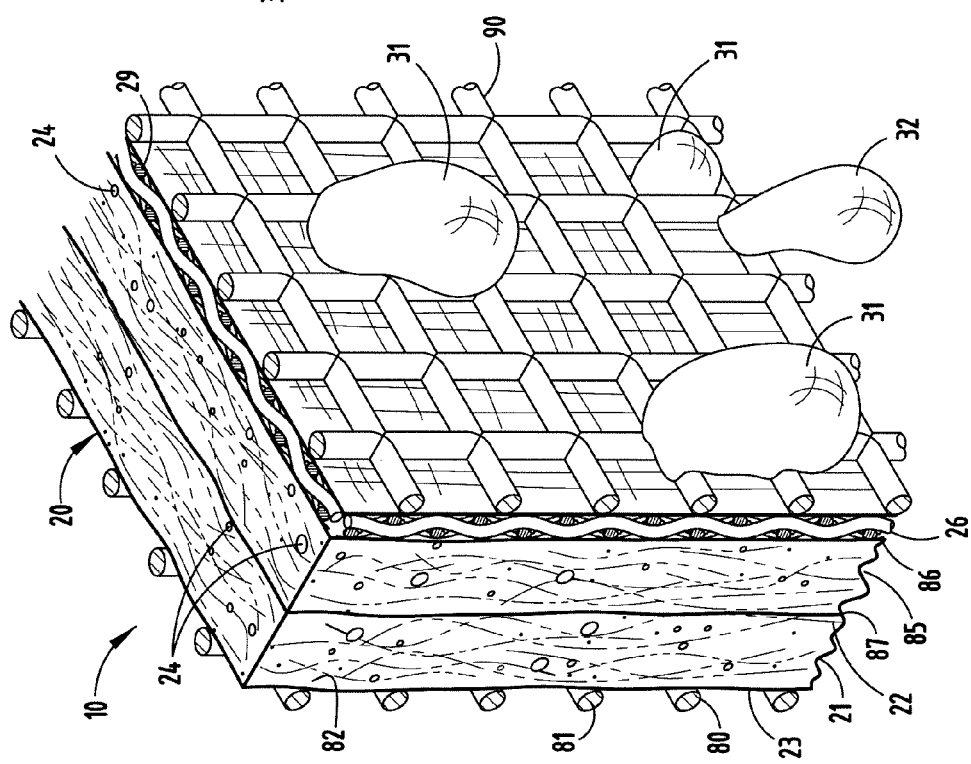
FIG. 5 is an enlarged, partially diagrammatic, front elevational view of the coalescence media, showing water droplets forming on the downstream surface thereof, and falling under gravitational forces toward the bottom of the filter apparatus.

The reference numeral 1 (FIGS. 1-5) generally designates a coalescer element embodying the present invention. The coalescer element 1 illustrated in FIGS. 1-22 is generally a liquid/liquid separator, and is specifically designed for use in conjunction with a wide variety of oil based industrial liquids. The term "oil based industrial liquids", as used herein, is intended to cover liquids that are not miscible with water, including, but not limited to, petrochemicals in the nature of gasoline, diesel fuel, jet fuel, turbine oil, gear oil, hydraulic fluids, lubricating oil, etc., organic and/or vegetable bio-fuels, oils, petrodiesel-biodiesel fuel blends, etc., as well as synthetic based fuels, lubricants and the like. In the embodiment illustrated in FIGS. 1-22, coalescer element 1 includes a porous support tube 2 (FIGS. 1-3A) having a hollow interior 3, a radially oriented exterior surface 4, a radially oriented interior surface 5, and a permeable sidewall 6 through which an oil based industrial liquid flows in an inside out direction from interior surface 5 to exterior surface 4, as illustrated by the arrows in FIGS. 2 and 3. Coalescer element 1 also includes a coalescer pleat block 10 having a hollow interior 11, a radially oriented exterior surface 12, a radially oriented interior surface 13 overlying the exterior surface 4 of support tube 2 and a plurality of individual pleats 14 arranged side-by-side and formed from an integrated multilayer coalescence media 20 (FIGS. 3-5). In the embodiment illustrated in FIGS. 1-22, coalescence media 20 includes at least one layer 21 (FIGS. 3-4) of a non-woven fibrous material that preferably is at least partially wettable by the dispersed contaminant liquid water particles in the oil based industrial liquid, and has a downstream face 22, an oppositely disposed upstream face 23 disposed adjacent to the exterior surface 4 of support tube 2, and a predetermined thickness, mean flow pore size, hydrophilic or water repellency level and stiffness sufficient to commence coalescence of the dispersed contaminant liquid water particles in the incoming oil based industrial fluid as the same flows therethrough and thereby form a plurality of relatively small primary water droplets 24 (FIGS. 3A and 4). The coalescence media 20 also includes at least one sheet 26 (FIGS. 3-4) of a precisely woven monofilament fabric that is substantially completely wettable by the dispersed contaminant liquid water particles in the oil based industrial liquid, and has a downstream face 27, an oppositely disposed upstream face 28 disposed adjacent to the downstream face 22 of the layer 21 of non-woven fibrous material, and interconnected monofilament fibers 29 that define a fixed open mesh with uniformly sized and spaced apart pore openings 30 and a hydrophilic level sufficient to continue coalescence of the dispersed contaminant liquid water particles in the incoming oil based industrial liquid. As a result, the oil based industrial liquid that passes through pleat block 10 undergoes a multistep coalescence process, wherein the primary water droplets 24 (FIGS. 3A and 4) formed in the layer 21 of non-woven fibrous material flow in a generally uniform pattern from the downstream face 22 of the non-woven layer 21 onto the upstream face 28 of the sheet 26 of precisely woven monofilament fiber, and attach to the monofilament fibers 29 of the open mesh due to strong droplet wettability over the same, and while so attached, experience bidirectional hydrodynamic interactions with adjacent primary water droplets 24 and the oil based industrial liquid flowing therethrough which cause the primary water droplets 24 to deform and reflow on the sheet 26 of precisely woven monofilament fiber, thereby growing the same in size into relatively large secondary water droplets 31 (FIGS. 3A-5), which are in turn distributed in a generally homogeneous spatial relationship across the downstream face 27 of the sheet 26 of precisely woven monofilament fiber, and continue to grow in size thereon through reflowing and/or colliding with other primary and/or secondary water droplets 24, 31 into relatively large water drops 32 having a size sufficient that the viscous drag forces of the oil based industrial liquid flowing through the coalescer element 1 cause the large water drops 32 to release from the downstream face 27 of the sheet 26 of precisely woven monofilament fiber and fall or settle downwardly under gravitational forces from the pleat block 10 for collection adjacent a bottom portion of the coalescer element 1.

Figure 8:
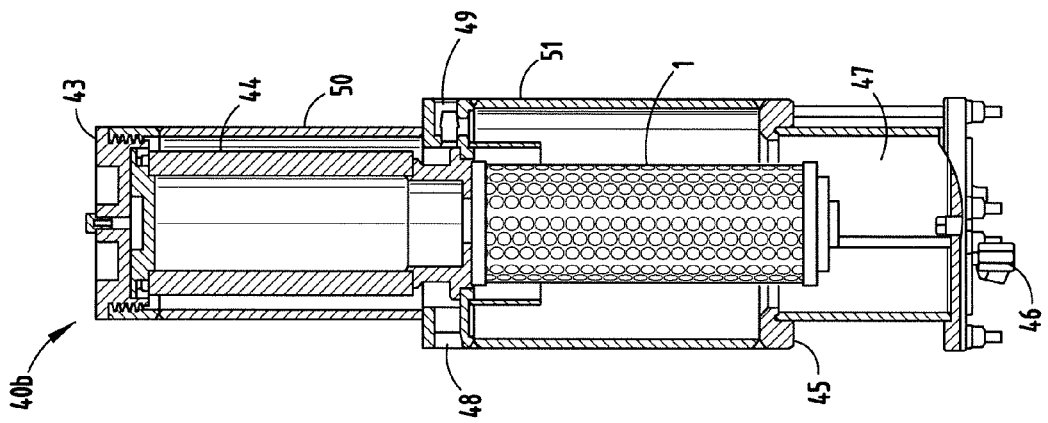
FIG. 8 is a partially diagrammatic, cross-sectional view of a vessel portion of the filtering machine shown in FIGS. 6 and 7, with a particulate filter element and a coalescer element installed therein.
Figure 7:
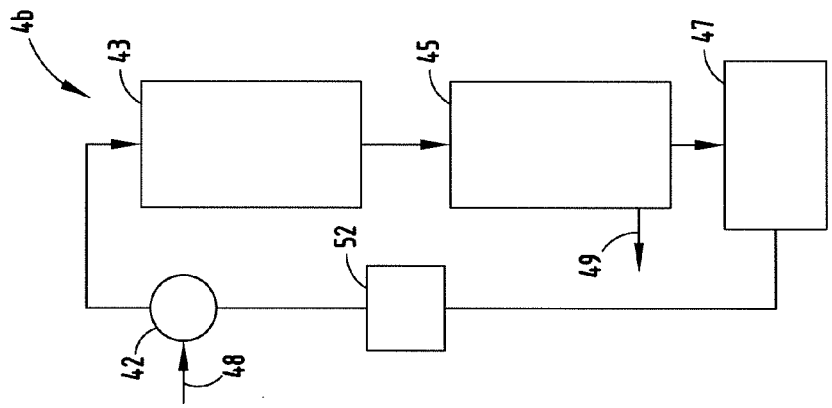
FIG. 7 is a diagrammatic view of the filtering machine shown in FIG. 6.
Figure 6:
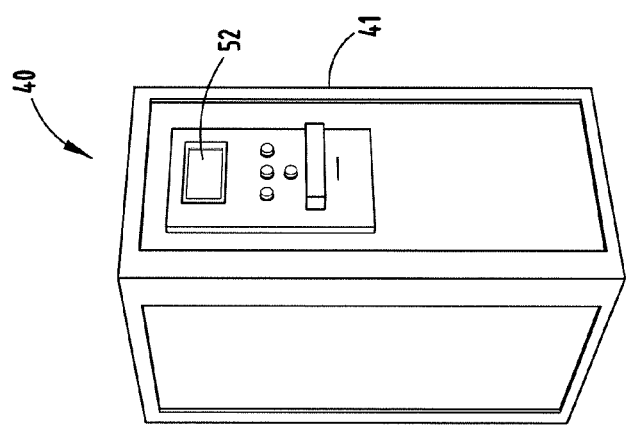
FIG. 6 is a perspective view of a filtering machine in which the coalescer element may be used.

With reference to FIGS. 6-8, filter coalescer element 1 is adapted to be used in conjunction with a commercially available fuel filtering machine 40, such as the Kaydon brand fuel/water separation system CFS-6 illustrated in FIGS. 6-8. The illustrated fuel filtering machine 40 is a self-contained filtration system mounted inside a housing 41, and includes a particle pre-filter subsystem 43, a water coalescer subsystem 45, a water reservoir subsystem 47, a fuel feed pump subsystem 42, and a touch-screen based control subsystem 52. Among other types of filtration vessels mounted inside fuel filtering machine 40, filtration vessel 40 is a compact and service-friendly one integrating three major subsystems together into a vertically stacked, series unit, i.e., particle pre-filter subsystem 43, water coalescer subsystem 45 and water reservoir subsystem 47. Replacement of both particle element 44 inside cylindrical house 50 and water coalescer element 1 inside cylindrical house 51 is service-friendly due to their vertically stacked, series configuration. Under touch-screen based control subsystem 52, the contaminated fuel or other oil based industrial liquid to be filtered is pressured by fuel feed pump subsystem 42, which flows the fuel or other industrial liquid through an inlet port 48 in filtration vessel 40b, through solid particle filter element 44 in the outside to inside direction, then through the water coalescer element 1 in the inside to outside direction. The conditional fuel or other industrial liquid then flows through outlet port 49 to the associated engine, machine or equipment (not shown).

The coalescer element 1 illustrated in FIGS. 1-22 is specifically constructed to remove dispersed contaminant liquid water particles from bio-fuels, petro-fuels, and/or various blends of the same. In one working example of the embodiment illustrated in FIGS. 1-22, coalescer element 1 is positioned immediately downstream of solid particle filter element 44, and has an outside diameter of 4.25 inches, a length of 12.0 inches, and is configured for an inside to outside flow pattern.

Figure 9:
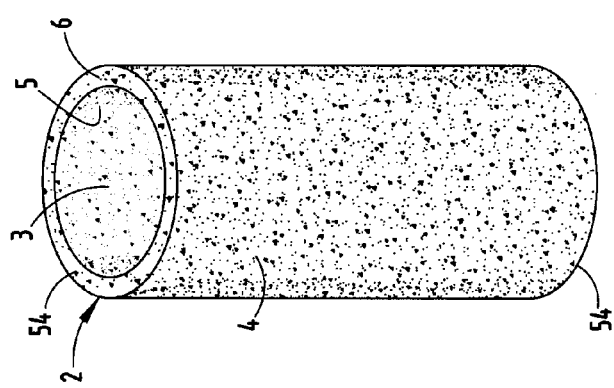
FIG. 9 is a fragmentary, perspective view of a porous support tube portion of the coalescer element.
Figure 10:
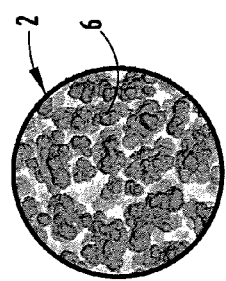
FIG. 10 is an enlarged, cross-sectional view of a sidewall portion of the porous support tube shown in FIG. 9.
Figure 17:
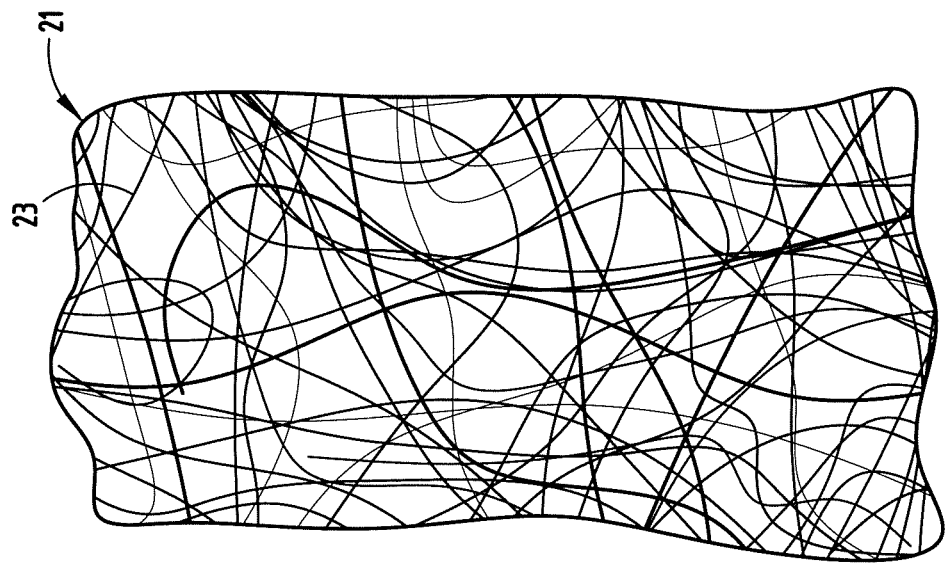
FIG. 17 is an enlarged, plan view of a non-woven fibrous material portion of the coalescence media.
Figure 16:
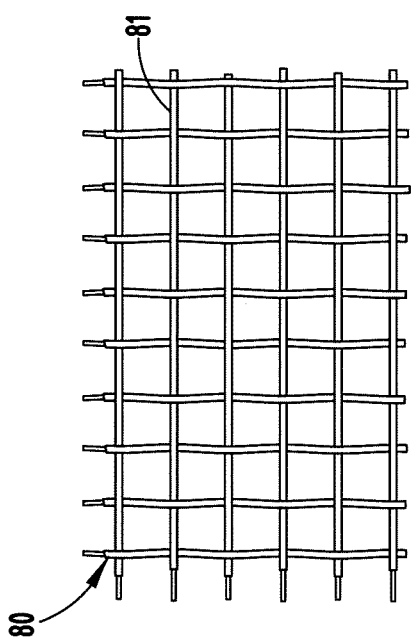
FIG. 16 is an enlarged, plan view of a wire screen portion of the coalescence media.
Figure 20:
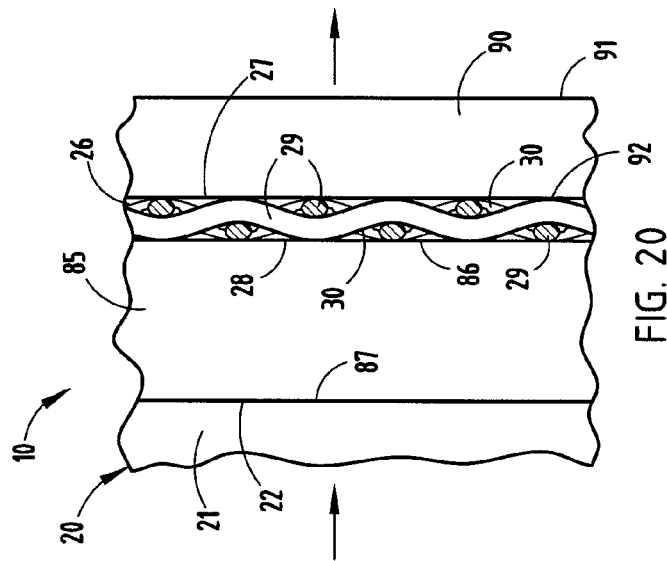
FIG. 20 is an enlarged, cross-sectional view of the coalescence media with the non-woven fibrous material and precisely woven monofilament fabric arranged in a closely stacked relationship.
Figure 18:
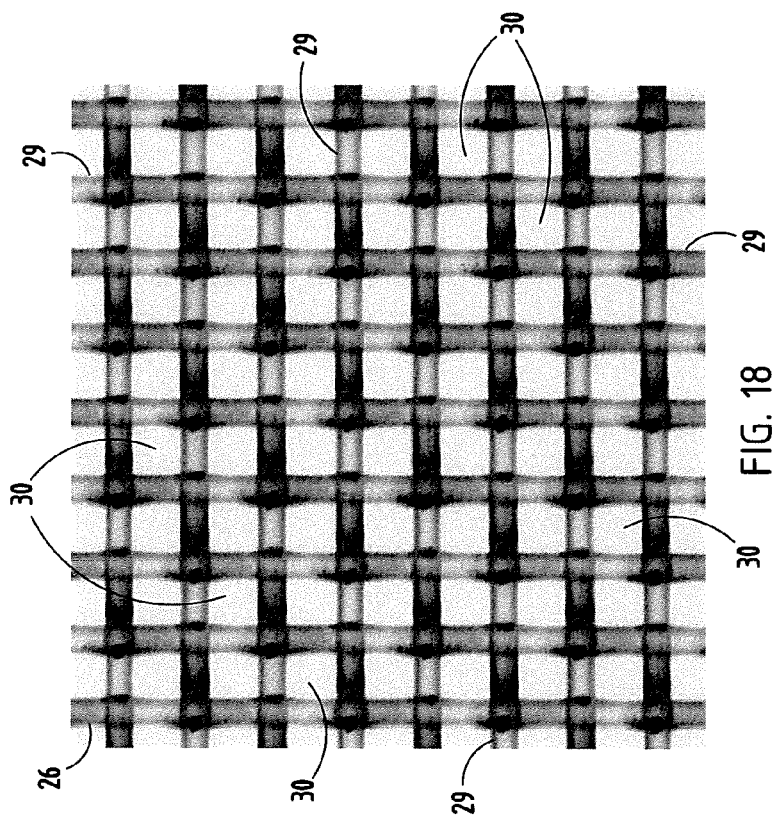
FIG. 18 is an enlarged, plan view of a precisely woven monofilament fabric portion of the coalescence media.
Figure 19:
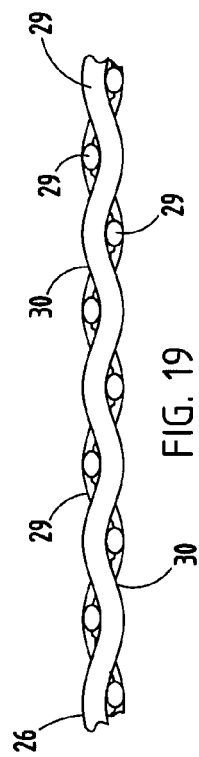
FIG. 19 is an end elevational view of the precisely woven monofilament fabric shown in FIG. 18.

With reference to FIGS. 9 and 10, the illustrated porous support tube 2 provides a rigid endoskeletal support structure for coalescer element 1, and has a generally cylindrical shape, with opposite circular end edges 54. The porous support tube 2 illustrated in FIGS. 1-22 is preferably in the form of a polyethylene porous pipe having a non-solid, sintered construction that is best illustrated in FIG. 10. In one working example of the embodiment illustrated in FIGS. 1-22, the porous support tube 2 has an outside diameter in the range of 1.5-2.5 inches, and in particular 2.325-2.405 inches, an inside diameter in the range of 1.0-2.5 inches, and in particular 1.850-1.895 inches, a radial wall thickness in the range of 0.20-0.75 inches, and in particular 0.215-0.278 inches, a porosity or pore size in the range of 20.0-40.0 microns, and a length in the range of 8.0-18.0 inches, and in particular 12.0 inches. An exemplary porous support tube 2 is manufactured by Porex Corp. under the "POREX®" trademark and is designated by the nomenclature schedule 40/SC40, item identification TUB-5338. The illustrated porous support tube 2 is partially wettable by the dispersed contaminant water particles in the oil based industrial fluid to ensure substantially homogeneous distribution of the incoming fuel-water blend over the upstream face 13 of the pleat block 10. Porous support tube 2 is relatively lightweight, rigid and resistant to chemicals and corrosion. The use of a porous tube 2 type of center support for coalescer element 1 is particularly advantageous for applications having relatively high continuous liquid flow through the coalescer element 1 and/or a relatively large content of dispersed contaminant liquid water particles in the oil based industrial liquid.

Figure 13:
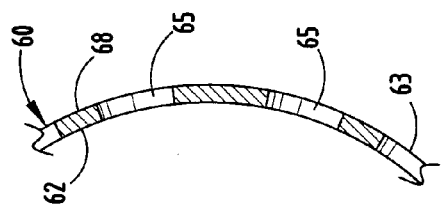
FIG. 13 is an enlarged, cross-sectional view of the support jacket shown in FIGS. 11 and 12.
Figure 11:
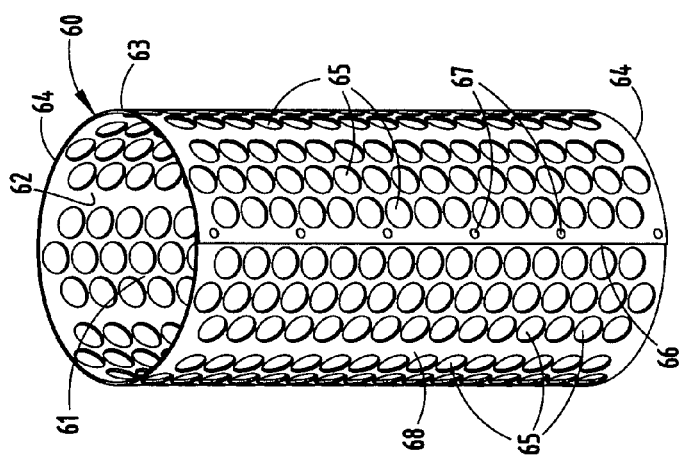
FIG. 11 is a fragmentary, perspective view of a support jacket portion of the coalescer element.
Figure 12:
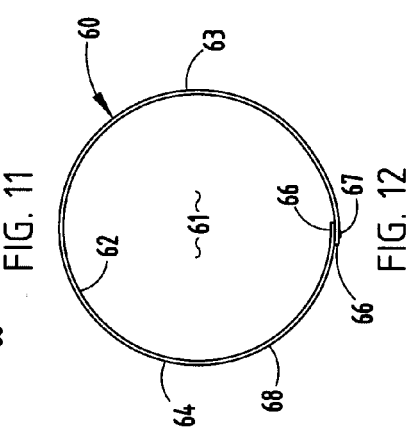
FIG. 12 is a lateral cross-sectional view of the support jacket shown in FIG. 11.

The coalescer element 1 illustrated in FIGS. 1-22 also includes a rigid support jacket 60, which as best illustrated in FIGS. 11-13, has a generally cylindrical shape with a hollow interior 61 in which pleat block 10 is closely received, a radially oriented interior surface 62 abutting the downstream face of pleat block 10, an exterior surface 68, an apertured or perforated sidewall 63 through which the oil based industrial fluid flows, and opposite circular end edges 64. Support jacket 60 provides a rigid exoskeletal support structure for coalescer element 1, and may be constructed from either nonmetallic materials, such as plastic, fiberglass or the like, as well as various metal materials, such as aluminum, steel and the like. In general, support jacket 60 restrains deformation of the pleated fibrous media block 10 under both mechanical and hydrodynamic loads. The illustrated support jacket 60 is constructed from a sheet of perforated aluminum with radially extending, circular holes 65 through sidewall 63, which sheet is formed into a cylindrical shape, with the opposite side edges 66 overlapped and interconnected by spot welds or fasteners 67 to form a rigid perforate cylinder that serves to retain pleat block 10 in the annular configuration illustrated in FIGS. 1 and 2. While support jacket 60 may be constructed from a wide variety of different materials, the use of aluminum or other similar materials inhibits corrosion, which is particularly advantageous in the coalescence process, since support jacket 60 is exposed to water droplets that are integrated into larger drops by coalescer element 1. Furthermore, the use of such materials reduces the overall weight of coalescer element 1. In one working example of the embodiment illustrated in FIGS. 1-22, support jacket 60 has an outside diameter in the range of 3.5-5.0 inches, and in particular 4.252 inches, a wall thickness in the range of 0.030-0.035 inches, a length in the range of 8.0-18.0 inches, and in particular 12.0 inches, and holes 65 with a diameter in the range of 0.20-0.30 inches, and in particular 0.25 inches and arranged in staggered longitudinally extending rows.

Figure 14:
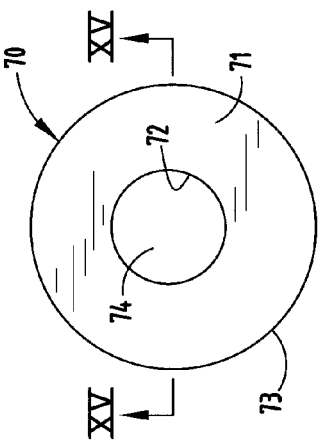
FIG. 14 is a top plan view of an end cap portion of the coalescer element.
Figure 15:
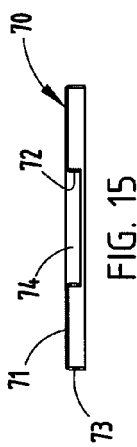
FIG. 15 is a cross-sectional view of the end cap shown in FIG. 14.

With reference to FIGS. 14 and 15, the coalescer element illustrated in FIGS. 1-22 also includes a pair of end caps 70, which hold the pleated fibrous media block 10, the porous support tube 2 and the support jacket 60 together in an assembled condition. Each end cap 70 has a generally annular shape that includes a generally flat outer surface 71, an axially extending inner edge 72 received in the interior 3 of porous support tube 2, and an axially extending outer edge 73 which is received over the opposite end edges 64 of support jacket 60. Each end cap 70 has a circular center hole 74 through which the oil based industrial liquid flows into the interior 3 of porous support tube 2, and then through pleat block 10 and support jacket 60 in an inside out direction. End caps 70 are relatively rigid, and may be constructed from metal, molded plastic, or other similar materials. In the illustrated example, end caps 70 are constructed from aluminum to resist corrosion and reduce the weight of coalescer element 1.

The multilayer coalescer media 20 incorporated into coalescer element 1 can be used in a wide variety of different applications to separate two immiscible fluids. Furthermore, the specific structure of each of the individual layers of the media filtering material, and their relative stacking arrangement in the coalescer media, will vary substantially in accordance with a particular application, including the nature of the fluids to be separated, the flow direction, flow speed, and other similar factors. In the embodiment illustrated in FIGS. 1-22, coalescer element 1 is specifically designed to remove dispersed contaminant liquid water particles from an oil based industrial liquid, particularly fuels, or the like. However, it will be understood that the coalescer media 20 may assume various configurations and arrangements to accommodate a given application.

In the embodiment illustrated in FIGS. 1-22, coalescence media 20 includes a total of five individual or separate layers, which are arranged in a predetermined, tightly stacked relationship to efficiently and effectively coalesce water from the incoming oil based industrial liquid. In the example illustrated in FIG. 3, the most upstream layer of coalescence media 20 is a first porous support layer 80, which is designed to securely retain the media layers 21, 85 and 26 in a tightly stacked relationship, and provide rigidity and support to pleat block 10 to alleviate pleat bunching and/or pleat block collapse during cold startups and the like. First support layer 80 has an upstream face 81 and a downstream face 82. In one working example of the embodiment illustrated in FIGS. 1-22, porous support layer 80 is constructed from a woven wire mesh or screen having a wire diameter in the range of 0.005-0.010 inches, and in particular 0.0007±0.001 inches, and a mesh size or count of 18×14 per linear square inch. Preferably, porous support layer 80 is made from a material such as epoxy coated steel or the like which resists corrosion, and is relatively lightweight.

In the example illustrated in FIG. 3, the next most upstream layer of coalescence media 20 is the layer 21 of non-woven fibrous material that is generally hydrophobic, but at least partially wettable by the dispersed contaminant liquid water particles in the oil based industrial liquid, and has a downstream face 22 and an oppositely disposed upstream face 23 abutting the downstream face 82 of first porous support layer 80. Non-woven layer 21 has a predetermined thickness in the range of 16.0-26.0 mils., a mean flow pore size in the range of 0.5-7.5 microns, a hydrophilic or water repellency level in the range of 4.0-10.0 inches of water (based upon media layer 21 having a thickness of around 16 mils), and a stiffness in the range of 1500.0-2000.0 mgs. that is sufficient to commence coalescence of the dispersed contaminant liquid water particles in the incoming oil based industrial liquid as the same flows through non-woven layer 21 and thereby form the relatively small primary water droplets 24. In one working example of the embodiment illustrated in FIGS. 1-22, non-woven layer 21 comprises a non-woven micro fiberglass filter media of the type manufactured by Lydall Inc. under the trade name Ly Pore, grade 9221, which has borosilicate micro fiberglass with fluoropolymer oil and water repellency treatment, and the following additional characteristics.

Basis weight: 60.0 lbs./30000.0 ft.²
Thickness: 21.0 mils.
Pressure Drop: 13.0 mm
Stiffness: 2000.0 mgs.
Mean Flow Pore: 6.5 microns
Water Repellency: 5.0 inches of Water Gauge
Binder: Epoxy In the example illustrated in FIG. 3, the next most upstream layer of the coalescence media 20 is a second layer 85 of a non-woven fibrous material that is also generally hydrophobic, but at least partially wettable by the dispersed contaminant liquid water particles in the oil-based industrial liquid, and has a downstream face 86 and an oppositely disposed upstream face 87 abuttingly overlying the downstream face 22 of the first layer 21 of non-woven fibrous material. The second layer 85 of non-woven fibrous material has a predetermined thickness in the range of 10.0-20.0 mils., a mean flow pore size in the range of 0.5-7.5 microns, a hydrophilic or water repellency level in the range of 15.0-30.0 inches of Water Gauge (based on media layer 85 having a thickness of around 15.0 mils.), and a stiffness in the range of 800.0-2000.0 mgs. that is sufficient to continue coalescence of the dispersed contaminant liquid water particles in the incoming oil based industrial fluid as the same flows therethrough and thereby grow the size of the relatively small primary water droplets 24 therein. In the example illustrated in FIG. 3, the fibers of the layer 85 of non-woven fibrous material are substantially more hydrophilic than the fibers of the first layer 21 of non-woven fibrous material. More specifically, in the noted example, the second layer 85 of non-woven fibrous material has a water repellency (20.0 inches of Water Gauge) of around four times the water repellency (5.0 inches of Water Gauge) of that of the first layer 21, which comparison is based upon similar thicknesses of media layer 21 and 85. In one working example of the embodiment illustrated in FIGS. 1-22, non-woven layer 85 comprises a non-woven micro fiberglass filter medial of the type manufactured by Lydall Inc. under the trade name LyPore, grade 9103, which has borosilicate micro fiberglass with fluoropolymer oil and water repellency treatment, and the following additional characteristics.

Basis Weight: 46.0 lbs./30000.0 ft.²
Thickness: 15.0 mils.
Pressure Drop: 14.5 mm
Stiffness: 950.0 mgs.
Mean Flow Pore: 6.4 microns
Water Repellency: 20.0 inches of Water Gauge
Binder: Acrylic As presently understood, the dispersed contaminant liquid water particles in the oil based industrial fluid form and migrate through the layers 21 and 85 of non-woven fibrous media in the general direction of fluid flow, and grow in size therein through interface with and attachment to the generally hydrophobic, but at least partially hydrophilic fibers of the non-woven layers 21 and 85. It has been determined that normally, generally hydrophobic, but at least partially hydrophilic media layers 21 and 85 have better coalescence performance, even at high face velocities, than highly or substantially completely hydrophobic media layers. The tiny water droplets attach to the media fibers and grow in size as a result of numerous collisions with other water droplets as the same migrate through the non-woven media layers 21 and 85. Preferably, by the time primary water droplets 24 reach the downstream face 86 of non-woven medial layer 85, they grow into a size or average diameter that is several times larger than the pore opening size of the sheet 26 of precisely woven monofilament fabric. For example, in one working example of coalesce media 20, the primary water droplets 24 reach an average diameter of five to ten times the size of the pore openings of the sheet 26 of precisely woven monofilament fabric when they are dispersed onto the upstream face 28 of the same.

In the example illustrated in FIG. 3, the next most upstream layer of the illustrated coalescence media 20 is the sheet 26 of precisely woven monofilament fabric that is substantially completely wettable by the dispersed contaminant liquid water particles in the oil based industrial liquid. Precisely woven monofilament fabric layer 26 has a downstream face 27 and an oppositely disposed upstream face 28 abuttingly overlying the downstream face 86 of the second layer 85 of non-woven fibrous material. Precisely woven monofilament fabric 26 has a fixed open mesh with uniformly sized and spaced apart pore openings with a predetermined mean flow pore size in the range of 5.0-150.0 microns, and a degree of fabric wettability in the range of 0.0-90.0 degrees contact angle that is sufficient to continue coalescence of the dispersed contaminant water particles in the incoming oil based industrial liquid.

The warp and weave threads or fibers 29 of precisely woven media sheet 26 are preferably woven using a simple weave, and are positively fixed together at their intersections by a lock stitch, adhesive, thermal fusing or the like to ensure that the pore openings are equally sized, shaped and spaced over the entirety of both faces 27 and 28 of media sheet 26, and that these characteristics remain substantially unchanged during operation. This arrangement maximizes the exterior surface areas of the fibers 29 to which the primary and secondary water droplets 24, 31 attach and grow. In the illustrated example, fibers 29 are monofilament, and create a basket weave profile which further assists in attracting and growing a large number of water droplets 31 thereon in a generally homogeneously dispersed pattern across media sheet 26, which improves the chances of intercepting incoming dispersed contaminant water particles, and coalescing the same with the fiber attached water droplets 31 in a multistep coalescence process.

In the example illustrated in FIG. 3, the sheet of precisely woven monofilament fabric 26 is constructed from a polyester material with fixedly interconnected threads having a diameter in the range of 10.0-100.0 microns. In one working example of the embodiment illustrated in FIGS. 1-22, precisely woven layer 26 has a hydrophilic monofilament open mesh, and is the type manufactured by SaatiTech® under the trade name SaatiCare® Hyphyl, grade PES 18/13 TW with plasma surface treatment to increase hydrophilicity, and the following spreading and wicking performances shown in Table 1.

TABLE 1

Spreading and Wicking Performances of SaatiCare ® Media

| Type of Fabric | Finishing | Bed Volume [μl/cm²] | Porosity [%] | Drop Area Base [mm²] | Contact Angle [°] | Volume of Liquid | | |
|---|---|---|---|---|---|---|---|---|
| | | | | | | On Surface [%] | In Bed Vol. [%] | Through [%] |
| SaatiCare ® PES 18/13 | Standard* | 2.5 | 42.0 | 3.9 | 105.0 | 92.5 | 2.5 | 5.0 |
| | Hyphyl 780** | 2.5 | 42.0 | 14.3 | 0.0 | 0.0 | 8.9 | 91.0 |

*Monofilament Fiber without Plasma Surface Treatment
**Monofilament Fiber without Plasma Surface Treatment
Additional Technical Information Sheet of SaatiCare ® Media
Product: PES 18/13
Mesh Opening: 18.0 μm
Open Area: 13.0%
Mesh Count: 508.0 number/inch
Thread Diameter: 31.0 microns
Weight: 1.4 oz./yd.²
Thickness: 60.0 microns
Air Permeability: 775.0 l/m²
Holding Capacity: 2.5 μl/cm²

As presently understood, the highly hydrophilic surface nature of the sheet 26 of precisely woven monofilament fabric is an important factor in the ability of coalescence media 20 to efficiently and effectively remove the dispersed contaminant liquid water particles from the oil based industrial liquid. As noted above, the precisely woven fibers 29 are constructed from a polyester material and have hydrophilic surface treatment thereon. Alternatively, as described in greater detail below, the sheet 26 of precisely woven monofilament fabric may be constructed of polyamide fibers, which are hydrophilic themselves, and therefore do not require a hydrophilic surface treatment. In either event, it is preferred that the sheet 26 of the precisely woven monofilament fabric be constructed of a highly wettable or hydrophilic material that is substantially completely wettable by the dispersed contaminant liquid water particles in the oil based industrial liquid. The highly hydrophilic surface nature of the sheet 26 causes the primary water droplets 24, which flow from the downstream face 86 of the layer 85 of non-woven fibrous material, to quickly and securely attach to precisely woven fibers 29 on the upstream face 28 of precisely woven sheet 26. As currently understood, there are multiple forces that act on the tiny primary water droplets 24 which are distributed onto the upstream surface 28 of precisely woven media layer 26. One such force is the attachment force applied to the primary water droplets 24 along the perimeters of their interfaces with the generally cylindrically-shaped outer surfaces of precisely woven fibers 29. Another such force is the interface tension applied on the attached primary water droplets 24 along their interfaces with oil based industrial liquid. Both attachment force and interface tension deform and reflow the primary water droplets attached on the woven media fibers 29 to minimize their interface areas. Yet another such force applied on the primary water droplets 24 attached on the woven media fibers 29 is the detachment force generated by collisions with the dispersed contaminant liquid water particles flowing through the precisely woven media sheet 26 within the oil based industrial liquid. Another detachment force acting on the primary water droplets 24 attached to the media fibers 29 is the viscous drag force applied by the oil based industrial liquid flowing through the precisely woven media sheet 26. Both detachment forces attempt to release the primary water droplets 24 from their associated media surfaces, and thereby halt or at least impede the coalescence process. Summarily, if the total summation of all above attachment forces applied on anyone of the primary water droplets 24 attached on the woven fibers 29 is several times larger than the total summation of all above detachment forces applied on the same, this primary water droplet keeps attaching on the media fibers 29 and simultaneously growing up in size into one of the secondary water droplets 31 by coalescence with other adjacent water droplets 24, 31 on the media and/or in the oil based industrial liquid. To a certain extent, during the water droplet coalescence process, grown water droplets 31 are released from the media fibers 29 on the downstream surface 27 of the sheet 26 when the total summation of all detachment forces applied on them overcome the total summation of all attachment forces applied on the same. Consequently, the hydrophilicity of the precisely woven fabric media 26 significantly improves the attachment of the primary water droplets on the media, and the precise open pattern of the precisely woven media 26 prevents the formation of the water films on the downstream face 27 to such a large extent that the oil based industrial liquid flow is significantly choked. Consequently, the hydrophilicity of the precisely woven fabric media sheet 26 has a very positive impact on both significantly increasing coalescence efficiency, even in heavily water contaminated fuel, and minimizing the size of the coalescer element.

In the example illustrated in FIG. 3, the next most upstream and last layer of coalescence media 20 is a second porous support layer 90 having a downstream face 91 and an oppositely disposed upstream face 92 that is abuttingly overlying the downstream face 27 of the precisely woven monofilament fabric 26. The second porous support layer 90 is designed to securely retain the media layers 21, 85 and 26 in a tightly stacked relationship, and provide additional rigidity and support to pleat block 10 to alleviate bunching and/or pleat block collapse during cold startups and the like. In one working example of the embodiment illustrated in FIGS. 1-22, the second porous support layer 90 is constructed from a woven wire mesh or screen having a wire diameter in the range of 0.005-0.015 inches, and in particular 0.10±0.001 inches, and a mesh size of 12.0×10.0 meshes per square inch. Preferably, the second porous support layer 90 is made from a material such as epoxy coated steel or the like, which resists corrosion and is relatively lightweight.

The coalescer element illustrated in FIGS. 1-22 is preferably manufactured in accordance with the following process. An elongate section of porous tube 2 is cut to a length commensurate with the desired axial dimension or length of the coalescer element 1. Elongate strips of the five media layers 80, 21, 85, 26 and 90 forming coalescer media 20 are positioned overlying one another in a flat, stacked condition in the sequence illustrated in FIG. 3, with first porous support layer 80 disposed at the upstream face of coalescence media 20, and the second porous support layer 90 positioned at the downstream face of coalescence media 20. Media layers 80, 21, 85, 26 and 90 may be supplied in large rolls, which are unrolled and straightened prior to tightly stacking the same overlying one another as noted above. Next, the stacked media layers 80, 21, 85, 26 and 90 are pleated to securely interconnect the various layers and form a media strip with a plurality of individual pleats 14 arranged in a side-by-side relationship. In one working embodiment of the present invention, the media layers 21, 85 and 26 are mechanically captured between porous support layers 80 and 90, so as to securely retain the same in a tightly stacked arrangement, without the need for intermediate layers of adhesive or the like, which can restrict liquid flow through the pores of the coalescence media 20. The pleated media strip is then cut to a predetermined length consistent with the circumference of the selected coalescer element 1. The cut length of media strip is then formed into a cylindrical shape similar to the exterior surface 4 of porous support tube 2. The free side edges of the cut media strip are then interconnected in a conventional fashion to define the cylindrically-shaped pleat block 10 illustrated in FIGS. 1 and 2. Next, the formed coalescer pleat block 10 is positioned around the porous support tube 2, with the upstream face 81 of the first porous support layer 80 disposed adjacent to the exterior surface 4 of porous support tube 2. Alternatively, the cut length of media strip can simply be wrapped around the exterior surface 4 of porous support tube 2. Support jacket 60 is then positioned about the exterior surface 12 of pleat block 10, such that the interior surface 62 of support jacket 60 abuttingly contacts and supports the exterior surface 12 of pleat block 10 within coalescer element 1. Next, a pair of end caps 70 are attached to and cover the opposite ends of support jacket 60, pleat block 10 and porous support tube 2 to complete the coalescer element 1. O-rings 93 may be positioned at the exterior face of end cap 70 to create a tight liquid seal when the coalescer element 1 is installed in water coalescer subsystem 45.

As previously discussed in conjunction with FIGS. 6-8, the coalescer element 1 illustrated in FIGS. 1-22 operates in the following manner. Contaminated fuel or other oil based industrial fluid is first passed through particle filter element 44 to remove solid particles from the fuel or other oil based industrial liquid. Next, the partially filtered fuel passes into the interior 3 of porous support tube 2 in an inside out direction. The differential pressure between the opposite faces 4 and 5 of porous support tube 2 drives the partially filtered fuel to pass through the porous sidewall 6 of support tube 2, thereby dispersing the partially filtered fuel in a generally homogeneous pattern onto the upstream face 13 of pleat block 10. The dispersed contaminant liquid water particles in the oil based industrial liquid fluid are coalesced for removal through the following multistep process. As the partially filtered fuel passes through the two layers 21 and 85 of non-woven fibrous materials, relatively small primary water droplets 24 are formed in the fuel, and grow in size, as shown in FIGS. 3A and 4. These primary water droplets 24 flow in a generally uniform pattern from the downstream face 86 of the layer 85 of non-woven fibrous material onto the upstream face 28 of the sheet 26 of precisely woven monofilament fabric. The primary water droplets 24 attach to the monofilament fibers 29 of the open mesh fabric due to strong droplet wettability over the same and unite together in mutually adjacent areas due to wetting driven coalescence. Furthermore, while the primary water droplets 24 are so attached to the monofilament fibers 29, they experience bidirectional hydrodynamic interactions with adjacent primary water droplets 24 and the oil based industrial liquid flowing therethrough. More specifically, as best understood, the hydrophilic adhesive attraction between the primary water droplets 24 and the precisely woven mesh fibers 29 is generally even or homogeneous in magnitude due to the precisely uniform shape, size and spacing of the pore openings, and acts in a direction generally parallel to the longitudinal axes of the fibers 29, or perpendicular to the flow direction, so that laterally adjacent water droplets 24 tend to combine or coalesce as a consequence of this hydrophilic attraction. At the same time, the oil based industrial liquid flows through the pores of precisely woven media sheet 26 in a direction generally perpendicular to the faces 27, 28 of precisely woven media sheet 26, which causes the primary water droplets 24 that have formed thereon to deform and reflow across and through the sheet 26 of precisely woven monofilament fiber, thereby growing the same in size into relatively large secondary water droplets 31 which are in turn distributed in a generally homogeneous spatial relationship across the downstream face 27 of the sheet 26 of precisely woven monofilament fiber, as shown in FIG. 4. In the example shown in FIG. 4, the larger secondary water droplets 31 have a generally clamshell shape, and are distributed across the downstream face 27 of precisely woven media sheet 26 in a somewhat regular or homogeneous side-by-side pattern. In the pleated coalescer media block 10 illustrated in FIG. 5, the larger secondary water droplets 31 tend to concentrate along the inner folds of pleats 14, because the fuel flow velocity near the inner folds is slower than the fuel flow velocity near the outer folds of pleats 14. The larger secondary water droplets 31 continue to grow in size on the downstream face 27 of the sheet 26 of precisely woven monofilament fiber through reflowing and/or colliding with the primary water droplets 24 and other secondary water droplets 31 into relatively large water drops 32 that have a size sufficient that the viscous drag forces of the oil based industrial liquid flowing through the coalescer element 1 cause the large water drops 32 to release from the downstream face 27 of the sheet 26 of precisely woven monofilament fabric and fall or settle downwardly under gravitational forces from pleat block 10 to a bottom portion or water reservoir tank 47 of the fuel filtering machine 40. Since the pore openings in woven media sheet 26 are fixed and precisely sized, shaped and spaced apart, liquid flow therethrough is homogeneous over both surfaces 27, 28, and the above-described multistep coalescence process is similarly uniform through and across coalescence media 20, thereby greatly enhancing coalescence effectiveness and efficiency. It has been determined that this unique construction, which incorporates both wetting driven coalescence and collision driven coalescence, can even compensate for the reduced interfacial tensions on interfaces between coalesced water droplets and the oil based industrial liquid which result from the existence of large quantities of surfactants, or similar chemicals in the oil based industrial liquid. The large water drops 32 are collected in the water reservoir tank 47 portion of fuel filtering machine 40 and are regularly removed for disposal.

Tests conducted on the one working example of the embodiment of the coalescer element 1 illustrated in FIGS. 1-22, and described hereinabove, reveal the following results.

TABLE 2

Total Water Contents in No. 2 Petrodiesel at both Upstream and Downstream

|  | Fuel-Water Flow Rates @Upstream (GPM) | Water Contents @ Upstream (%) | Water Contents @ Downstream (PPM) | Average Test Conditions During Sampling Period |
|---|---|---|---|---|
| Average | 2.0 | 0.79 | 77.71 | F.T. 77.0° F.; R.T. 77.5° F.; R.H. 64.0%; ΔP 2 PSID |
| Average | 2.0 | 1.33 | 80.54 | F.T. 78.0° F.; R.T. 77.5° F.; R.H. 62.0%; ΔP 2 PSID |
| Average | 4.2 | 0.63 | 93.09 | F.T. 77.0° F.; R.T. 77.2° F.; R.H. 65.0%; ΔP 5 PSID |
| Average | 4.2 | 1.28 | 91.69 | F.T. 78.0° F.; R.T. 77.2° F.; R.H. 65.0%; ΔP 5 PSID |
| Average | 6.3 | 0.76 | 105.26 | F.T. 78.0° F.; R.T. 77.0° F.; R.H. 66.0%; ΔP 7 PSID |
| Average | 6.3 | 1.06 | 111.49 | F.T. 77.0° F.; R.T. 77.0° F.; R.H. 66.0%; ΔP 7 PSID |
| Average | 8.3 | 0.64 | 126.87 | F.T. 77.0° F.; R.T. 76.8° F.; R.H. 66.0%; ΔP 8 PSID |
| Average | 8.3 | 0.97 | 158.07 | F.T. 77.0° F.; R.T. 76.8° F.; R.H. 66.0%; ΔP 8 PSID |

Notations
F.T.: Fuel Temperature
R.T.: Room Temperature
R.H.: Room Humidity
Δ P: Differential Pressure over Coalescer Element The reference numeral 20a (FIGS. 23 and 24) generally designates another embodiment of the coalescence media portion of the present invention, which includes a total of eight separate layers of filter material. Since coalescer media 20a is similar to the previously described coalescence media 20, similar parts appearing in FIGS. 1-22 and 23-24, respectively, are represented by the same, corresponding reference numeral, except of the suffix "a" in the numerals of the latter. Like coalescence media 20, coalescence media 20a positions the eight separate filter layers in a tightly stacked, overlying relationship to efficiently and effectively coalesce water from the incoming oil based industrial liquid. With reference to FIG. 23, the most upstream layer 80a of coalescence media 20a is a first porous support layer, which is designed to securely retain the media layers 21a, 95, 85a, 96, 26a and 97 in a tightly stacked relationship, and provide rigidity and support to pleat block 10a to alleviate pleat bunching and/or pleat block collapse during cold startups and the like, and is substantially identical to previously described first porous support layer 80. The next most upstream layer 21a of coalescence media 20a is a layer of non-woven fibrous material that is partially wettable by the dispersed contaminant liquid water particles in the oil based industrial liquid, and is substantially identical to the previously described non-woven fibrous material layer 21. The next most upstream layer 95 of coalescence media 20a is another layer of the non-woven fibrous material used for layer 21a. The next most upstream layer 85a of coalescence media 20a is a layer of a non-woven fibrous material that is partially wettable by the dispersed contaminant liquid water particles in the oil based industrial liquid, and is substantially identical to the previously described media layer 85. The next most upstream layer 96 of coalescence media 20a is another layer of the non-woven fibrous material used for layer 85a. The next most upstream layer 26a of coalescence media 20a is a sheet of precisely woven monofilament fabric that is substantially completely wettable by the dispersed contaminant liquid water particles in the oil based industrial liquid, and is substantially identical to the previously described layer 26. The next layer 97 of the illustrated coalescence media 20a is another sheet of the precisely woven monofilament fabric that is substantially identical to the previously described layers 26 and 26a. The next and last layer 90a of coalescence media 20a is a second porous support layer that is designed to securely retain the media layers 21a, 95, 85a, 96, 26a and 97 in a tightly stacked relationship, and provide additional rigidity and support to the pleat block 10a to alleviate bunching and/or pleat block collapse during cold startups and the like, and is substantially identical to previously described porous support layer 90. Each of the layers 80a, 21a, 95, 85a, 96, 26a, 97 and 90a of coalescence media 20a is arranged in an overlying, tightly stacked relationship, similar to that described above with respect coalescence media 20. Coalescence media 20a operates in a fashion similar to coalescence media 20, except that, as a result of the two sheets 26a, 97 of the precisely woven monofilament fabric, the bidirectional hydrodynamic interactions of the primary water droplets with adjacent primary water droplets and the oil based industrial liquid take place both laterally across the faces of sheets 26a and 97 in a direction generally normal to the direction of flow of the oil based industrial fluid, as well as axially through the stack of sheets 26a and 97 in a direction generally parallel to the direction of flow of the oil based industrial fluid. The second layer 97 of precisely woven monofilament fabric provides increased surface area along the threads or fibers 29 to which the primary droplets and secondary droplets 31 attach, as well as the adhesive interactions therebetween, so as to produce more and larger water droplets than coalescer media 20, without requiring any specific, predetermined alignment between the two woven sheets 26a and 97.

FIG. 25 is a plan view of a non-woven, porous scrim layer 100 that may be used with or in place of the porous support layers 80, 90 and 80a, 90a to provide additional rigidity and support to pleat block 10 and/or 10a to alleviate pleat bunching and/or pleat block collapse during cold startups and the like.

Figure 27:
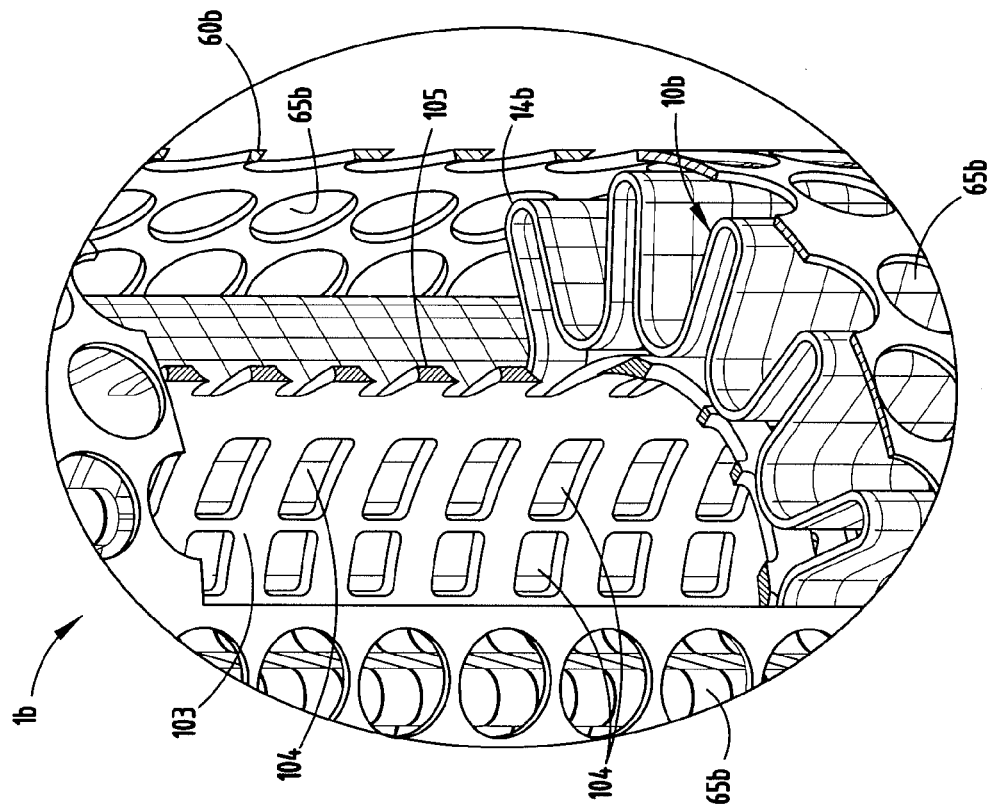
FIG. 27 is an enlarged, fragmentary view of the coalescer element shown in FIG. 26.
Figure 26:
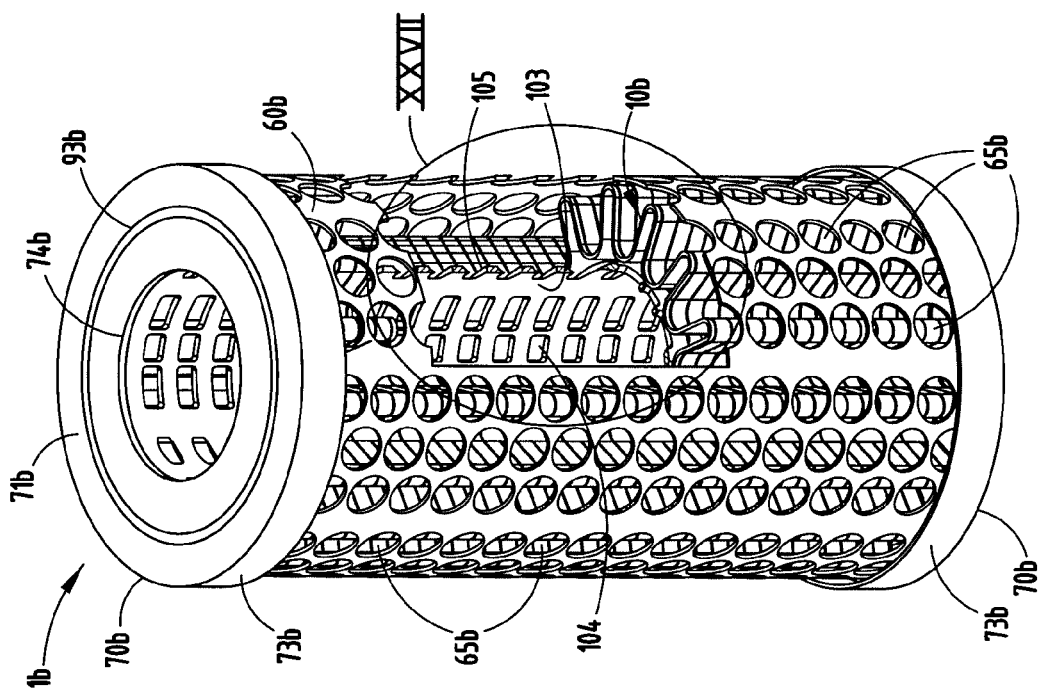
FIG. 26 is a perspective view of another embodiment of the present invention having an apertured center tube and corrugated pleat block, wherein portions of the coalescer element have been broken away to reveal internal construction.

The reference numeral 1b (FIGS. 26 and 27) generally designates another embodiment of the present invention having a perforated or apertured center support tube 103 instead of porous support tube 2. Since coalescer element 1b is similar to the previously described coalescer element 1, similar parts appearing in FIGS. 1-22 and 26-27, respectively, are represented by the same, corresponding reference numerals, except for the suffix "b" in the numerals of the latter. The illustrated perforated center tube 103 may be constructed from metal, plastic or the like, and includes rectangularly-shaped openings 104 which extend through the sidewall 105 of the tube 103.

Figure 29:
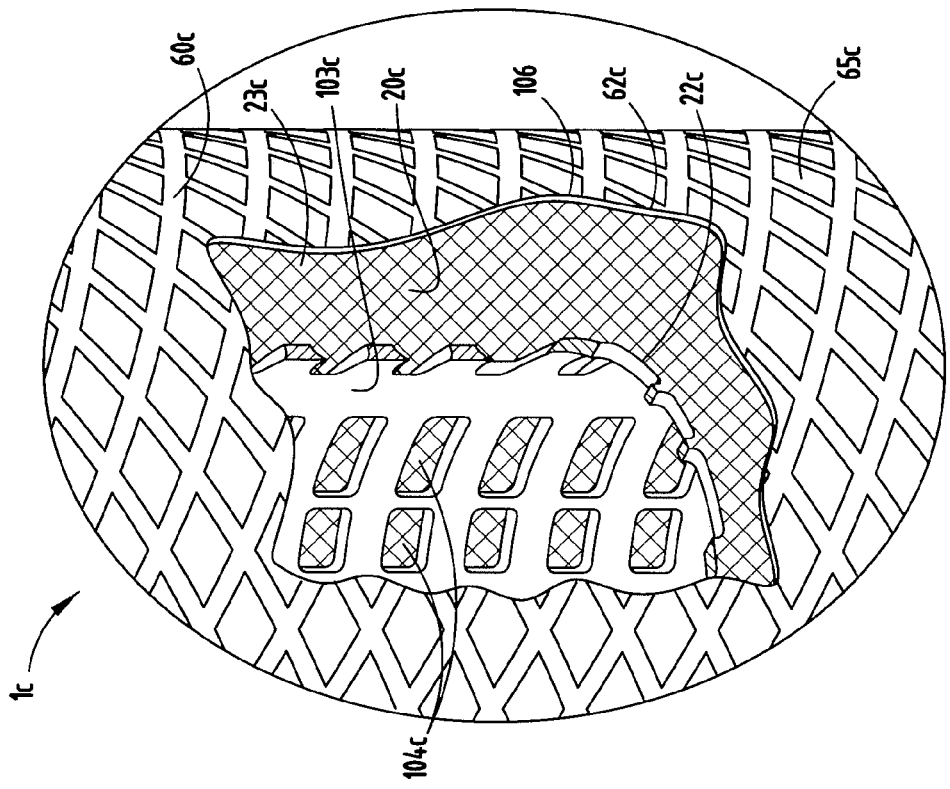
FIG. 29 is an enlarged, fragmentary view of the coalescer element shown in FIG. 28.
Figure 28:
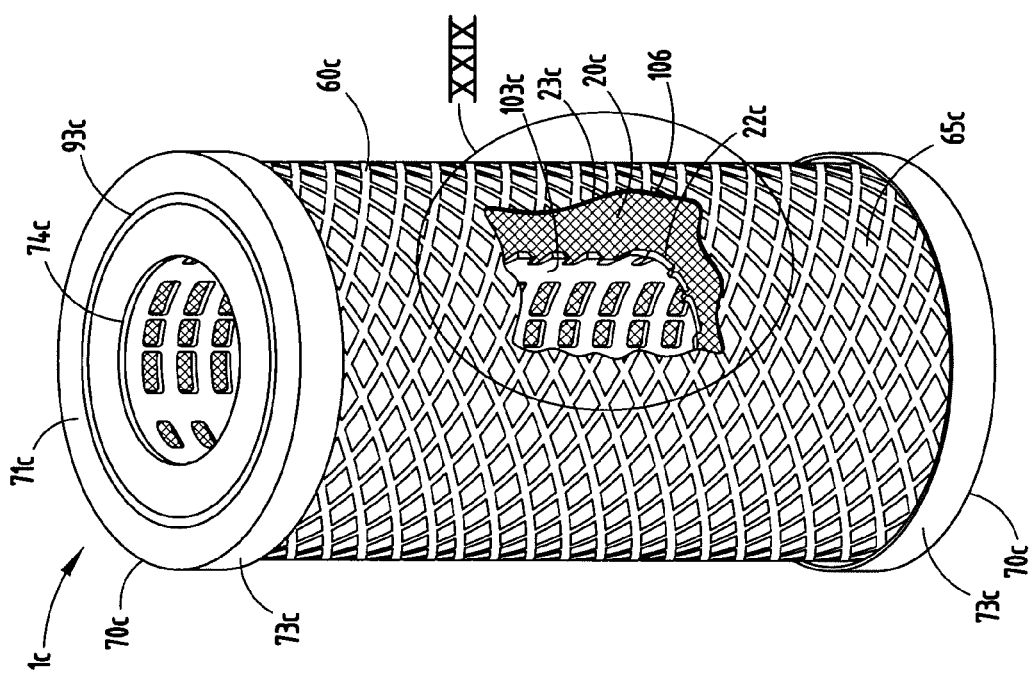
FIG. 28 is a perspective view of yet another embodiment of the present invention having an apertured center tube and a cylindrical coalescer cartridge, wherein portions of the coalescer element have been broken away to reveal internal construction.

The reference numeral 1c (FIGS. 28 and 29) generally designates another embodiment of the present invention having a non-pleated or cartridge style coalescence media 20c. Since coalescer element 1c is similar to the previously described coalescer elements 1 and 1b, similar parts appearing in FIGS. 1-22, 26 and 27 and 28 and 29, respectively, are represented by the same, corresponding reference numerals, except for the suffix "c" in the numerals of the latter. The illustrated coalescer element 1c has a perforated center support tube 103c, similar to that of coalescer element 1b. Furthermore, the coalescence media 20c is formed into a non-pleated, cylindrical-shaped cartridge 106, wherein the downstream face 22c is shaped to be closely received over the exterior surface of perforated tube 103, and the upstream face 23c is shaped to be in close abutting contact with the interior surface 62c of support jacket 60c.

Figure 31:
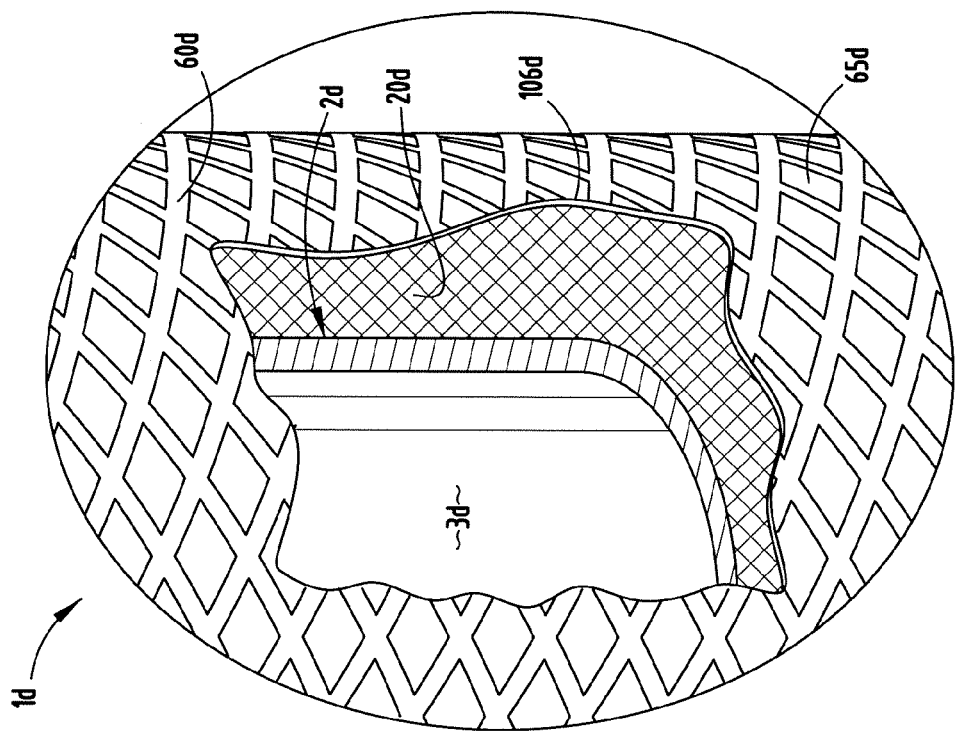
FIG. 31 is an enlarged fragmentary view of the coalescer element shown in FIG. 30.
Figure 30:
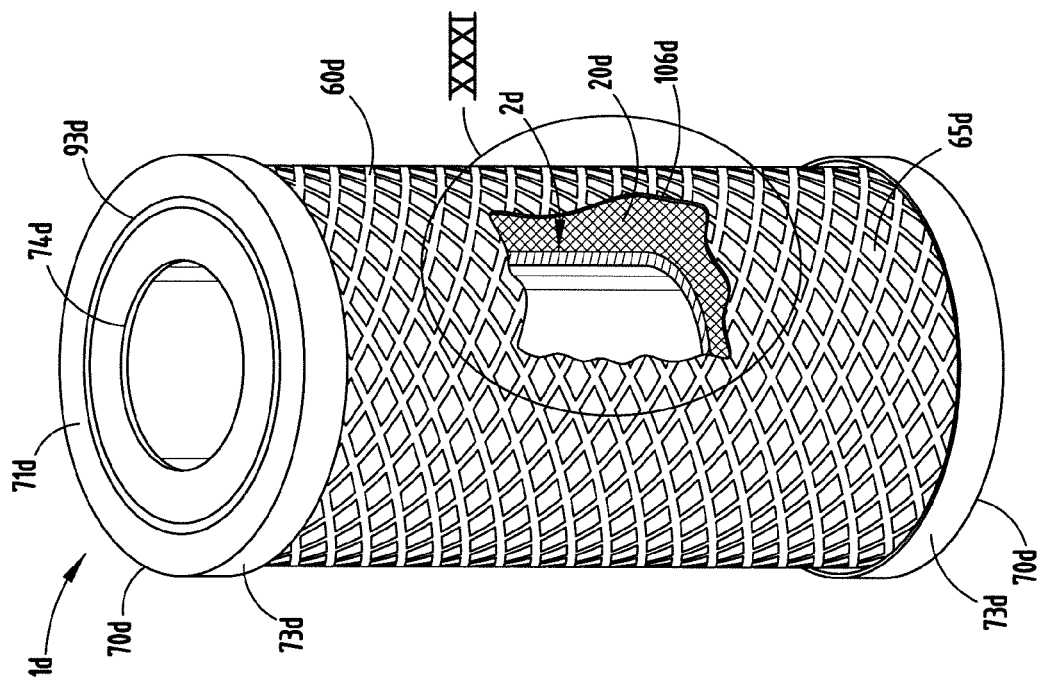
FIG. 30 is a perspective view of yet another embodiment of the present invention having a porous center tube and a cylindrical coalescer cartridge, wherein portions of the coalescer element have been broken away to reveal internal construction.

The reference numeral 1d (FIGS. 30 and 31) generally designates another embodiment of the present invention having a porous support tube 2d in combination with a non-pleated, cartridge 106d type of coalescence media 20d. Since coalescer element 1d is similar to the previous described coalescer elements in FIGS. 1-22, 26-27 and 28-29, similar parts appearing in FIGS. 30 and 31 are represented by the same, corresponding reference numerals except for the suffix "d" in the numerals of the latter. The illustrated coalescer element 1d has a porous center support tube 2d which is substantially identical to the previously described porous support tube 2. Furthermore, the illustrated coalescer element 1d has a non-pleated media 20d in the form of a cylindrically-shaped coalescence cartridge 106d, instead of the pleated coalescence media used in conjunction with coalescer element 1.

Experiments and testing on the various coalescer elements illustrated and described above reveal that several different coalescence media layers, and arrangements thereof, may be used to achieve effective and efficient coalescence of dispersed contaminant liquid water particles in fuels and other oil based industrial liquids in the manner described hereinabove. For example, another non-woven fibrous material 107 that may be used in conjunction with coalescer elements 1-1d may include a laminated filter material with a base material that consists of glass microfibers with 3.0-7.0 percent of acrylic resin binder along with two supporting scrims that are made from high strength spun bound non-woven polyester. A 0.5 oz./yd.$^2$ polyester scrim is laminated to the felt side of the base paper which is typically the upstream side of the media. A 1.35 oz./yd.$^2$ scrim is laminated to what is typically the downstream or wire side of the media for structural support. Both scrims are bonded to the glass media using a polyester hot melt, which has a melting point of 325.0° F. One such media is manufactured by Hollingsworth and Vos under the trade name HOVOGLASS PLUS®, and grade RR-2141-AD, which has the following additional characteristics.
Basis Weight, lbs./3000.0 SF (uncured): 83.0±8.0
Caliper, mils. (optical): 27.0±4.0
Corrugation Depth, mils.: None
Frazier Air Flow (CFM/SF @ ½" H$_2$O Δ P): 11.0 (9.0 min.)
Initial Bubble Point (in. H$_2$O-AC 394): 18.0 (16 min)
Third Bubble Point: 19.0 (17.0 min.)
   DOP Smoke Penetration—(%) @32 liters/min.: 6.0 (10.0 max.)
   Resin—% by Weight: Beater added; Type: Acrylic
   Tensile Strength, lbs./inch: 4.5 (3.0 min.)
Dry Mullen Burst, PSI (Cured): 40.0 (25.0 min.)
Slit Widths and Tolerances:
5.54"+0.015-0.000
5.88"+0.015-0.000
8.02"+0.015-0.000
9.13"+0.015-0.000
9.54+0.015-0.000
17.79"+0.015-0.000
21.87"+0.015-0.000
38.00"+0.015-0.000

Another non-woven media 108 that may be used in coalescer elements 1-1d is a non-woven micro fiberglass manufactured by UPF Corp. under the trademark name ULTRACORE® and grade UFM80-85.25, which is nylon backed, and has the following additional characteristics.
Thickness (inches): 0.25+/−0.06
Length (feet): 600.0 min.
Surface Density (gr./sf.): 6.4
Color: No dye
Air Permeability (inches of W.G.): 0.26+/−0.04
ASHRAE Efficiency (52.1): 80.0-85.0%
Slit Widths and Tolerances: 46.00"+/−0.250"
UL-900: Class 2
Backing: Class 2 non-woven nylon Another non-woven media 109 that may be used in coalescer elements 1-1d is a non-woven nanofiber based filter media manufactured by Ahlstrom Corp. under the trade name DISRUPTOR® and grade 5281, which has nanoaluminum boehmite (aiooh) fibers 2.0 nanomicrons in diameter and 250.0 nanomicrons in length attached to a submicron micro glass structural fiber, and includes the following additional characteristics.
Weight (lbs./1389 ft.$^2$): 90.70
Weight (oz./yd.$^2$): 9.40
Thickness (mils.): 36.00
Rapidity (mls./min.): 5.00
Frazier Permeability (cfm./ft.$^2$): 0.40
Tensile Strength (lbs./in. MD): 13.00
Retention mean flow pore (μm): 0.70
Wet Burst (inch H$_2$O): >250.0

Another precisely woven monofilament fabric 110 that may be used in coalescer elements 1-1d is a precisely woven polyamide monofilament open mesh manufactured by SaatiTech® under the trade name SaatiCare® and grade PA55/43, and has the following additional characteristics.
Mesh Opening (μm): 55.0
Open Area (%): 43.0
Thread Diameter (μm): 30.0
Weight (oz./yd.$^2$): 0.6
Thickness (μm): 55.0
Air Permeability (l/m$^2$s): 5800.0
Porosity (%): 67.0
Holding Capacity (μl/cm$^2$): 3.7

Another precisely woven monofilament fabric media 111 that may be used in coalescer elements 1-1d is precisely woven hydrophilic monofilament open mesh fabric manufactured by SaatiTech® under the trade name SaatiCare® and grade PES47/31 with a plasma surface treatment to increase hydrophilicity, and the following additional characteristics.
Mesh Opening (μm): 47.0
Open Area (%): 31.0
Thread Count (number/inch): 305.0
Thread Diameter (μm): 34.0
Weight (oz./yd.$^2$): 1.0
Thickness (μm): 64.0
Air Permeability (l/m$^2$s): 4800.0
Porosity (%): 64.0
Holding Capacity (μl/cm$^2$): 4.1

Another precisely woven monofilament fabric media 112 that may be used in coalescer elements 1-1d is a precisely woven polyamide monofilament open mesh manufactured by NBC Inc. under the trade name DYNAMESH® and grade N-380-035-53A TW and having the following characteristics.

Mesh Count:
  Tolerance ±3%: Warp Mesh/inch 380.0
    Weft Mesh/inch 380.0
Weave Type: 2.0:2.0 TW
Thread Diameter (μm): 35.0
Mesh Thickness (μm): 68.0±5.0%
Mesh Opening (μm): 32.0
Open Area (%): 23.0
Theoretical Ink Volume ($cm^3/m^2$): 15.4

The present invention may be better understood with reference to the following additional examples. All of the examples disclosed herein are intended to be representative of specific embodiments of the present invention, and are not intended to in any way limit the scope of the invention.

ADDITIONAL EXAMPLE 1

Additional example one of new pleated coalescence media 20 is made up of two types of fibrous filter media tightly stacked together. One type, at the flow upstream side, is a stack of four layers of non-woven micro fiberglass filter media with two different media structures. More specifically, the first two non-woven media layers are made of media 21, which is non-woven micro fiberglass filter media with a mean flow pore size of 6.5 microns and a water repellency of 5.0 inches of Water Gauge, and the following two non-woven media layers are made of media 85, which is non-woven micro fiberglass filter media with a mean flow pore size of 6.4 microns and a water repellency of 20.0 inches of Water Gauge. The other type, at the flow downstream side, is a pile of two layers of media 26, which is precisely woven hydrophilic monofilament mesh with an opening of 18.0 microns and a thread diameter of 31.0 microns. Furthermore, the above six layers of fibrous filter media are retained between two layers of steel mesh screen 90 with a wire diameter of 0.10 inches and a mesh size of 10.0×12.0 per square inch to remain their contact between any two neighboring filter media layers even under hydrodynamic interactions due to through fuel-water blend flow. All eight layers of both fibrous filter media and steel mesh screens are pleated into a cylindrical media block, and one 2.0 inch polyethylene porous pipe 2 with a wall thickness of schedule 40 and a pore size of 20.0-40.0 microns is located at the center of the above cylindrical media block to homogeneously distribute incoming fuel-water blend flow over its inner filter media surface. The fuel-water blend flow direction through the above pleat media block is from the inside to the outside. The major design parameters of a coalescer element based on the above pleat media block are shown in Table 3, and a summary of the water removal test is listed in Table 4.

TABLE 3

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

TABLE 4

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.1 | 0.76 | 57.16 | F.T. 72.0° F.; R.T. 74.7° F.; R.H. 24.0%; ΔP 5 PSID |
| Average | 2.1 | 1.28 | 54.26 | F.T. 72.0° F.; R.T. 74.7° F.; R.H. 24.0%; ΔP 6 PSID |
| Average | 4.2 | 0.63 | 110.27 | F.T. 72.0° F.; R.T. 74.3° F.; R.H. 24.0%; ΔP 9 PSID |
| Average | 4.1 | 1.32 | 127.86 | F.T. 72.0° F.; R.T. 74.5° F.; R.H. 24.0%; ΔP 10 PSID |
| Average | 6.2 | 0.77 | 150.59 | F.T. 72.0° F.; R.T. 73.8° F.; R.H. 24.0%; ΔP 12 PSID |
| Average | 6.2 | 1.08 | 151.49 | F.T. 72.0° F.; R.T. 73.9° F.; R.H. 24.0%; ΔP 12 PSID |
| Average | 8.2 | 0.65 | 135.23 | F.T. 69.0° F.; R.T. 68.9° F.; R.H. 22.0%; ΔP 12 PSID |
| Average | 8.4 | 0.95 | 122.49 | F.T. 70.0° F.; R.T. 68.9° F.; R.H. 22.0%; ΔP 12 PSID |

Notations
F.T.: Fuel Temperature
R.T.: Room Temperature
R.H.: Room Humidity
Δ P: Differential Pressure over Coalescer Element

ADDITIONAL EXAMPLE 2

Additional example two of new pleated coalescence media 20 is made up of two types of fibrous filter media tightly stacked together. One type, at the flow upstream side, is a stack of four layers of media 21, which is non-woven micro fiberglass filter media with a mean flow pore size of 6.5 microns and a water repellency of 5.0 inches of Water Gauge. The other type, at the flow downstream side, is a pile of two layers of media 26, which is precisely woven hydrophilic monofilament mesh with an opening of 18.0 microns and a thread diameter of 31.0 microns. Furthermore, the above six layers of fibrous filter media are retained between two layers of steel mesh screen 90 with a wire diameter of 0.10 inches and a mesh size of 10.0×12.0 per square inch to remain their contact between any two neighboring filter media layers even under hydrodynamic interactions due to through fuel-water blend flow. Finally, all eight layers of both fibrous filter media and steel mesh screens are pleated into a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above cylindrical media block is from the inside to the outside. The major design parameters of a coalescer element based on the above pleated media block are shown in Table 5, and a summary of the water removal test is listed in Table 6.

TABLE 5

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside | between two layers of steel mesh screen 80, 90 with different screen sizes, that is, 18.0×14.0 meshes per square inch with wire diameter of 0.07 inches at the upstream and 10.0×12.0 meshes per square inch with wire diameter of 0.10 inches at the downstream. Finally, all six layers of both fibrous filter media and steel mesh screens are pleated into a cylindrical media block, and one 2.0 inch polyethylene porous pipe 2 with a wall thickness of schedule 40 and a pore size of 20.0-40.4 microns is located at the center of the cylindrical media block to homogeneously distribute incoming fuel-water blend flow over its inner filter media surface. The fuel-water blend flow direction through the above pleated media block is from the inside to the outside. The major design parameters of

TABLE 6

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 1.6 | 0.98 | 47.85 | F.T. 50.0° F.; R.T. 52.6° F.; R.H. 23.0%; ΔP 2 PSID |
| Average | 1.6 | 1.64 | 56.39 | F.T. 50.0° F.; R.T. 52.7° F.; R.H. 26.0%; ΔP 4 PSID |
| Average | 3.4 | 0.79 | 90.54 | F.T. 50.0° F.; R.T. 54.5° F.; R.H. 25.0%; ΔP 6 PSID |
| Average | 3.4 | 1.24 | 117.82 | F.T. 52.0° F.; R.T. 54.7° F.; R.H. 24.0%; ΔP 8 PSID |
| Average | 5.0 | 0.86 | 139.93 | F.T. 62.0° F.; R.T. 65.8° F.; R.H. 26.0%; ΔP 6 PSID |
| Average | 5.0 | 1.08 | 128.99 | F.T. 62.0° F.; R.T. 65.8° F.; R.H. 26.0%; ΔP 8 PSID |
| Average | 6.4 | 0.75 | 172.79 | F.T. 62.0° F.; R.T. 67.5° F.; R.H. 24.0%; ΔP 12 PSID |
| Average | 6.8 | 0.99 | 375.49 | F.T. 62.0° F.; R.T. 67.5° F.; R.H. 24.0%; ΔP 12 PSID |

Notations

F.T.: Fuel Temperature

R.T.: Room Temperature

R.H.: Room Humidity

ΔP: Differential Pressure over Coalescer Element

ADDITIONAL EXAMPLE 3

Additional example three of new pleated coalescer media 20 is made up of two types of fibrous filter media tightly stacked together. One type, at the flow upstream side, is a stack of three layers of non-woven fibrous filter media with two different media structures. More specifically, the first non-woven media layer is made of media 107, which is a laminated synthetic filter paper with Frazier air flow of 11.0 CFM/SF @ΔP ½" $H_2O$ and DOP smoke penetration of 6.0% @32 liters/min., and the following two non-woven media layers are made up of media 108, which is non-woven micro fiberglass filter media with an air permeability of 0.26 inches of water gauge and an ASHRAE efficiency (52.1) of 80.0-85.0%. The other type, at the flow downstream side, is one layer of media 26, which is precisely woven hydrophilic monofilament mesh with an opening of 18.0 microns and a thread diameter of 31.0 microns. Furthermore, to remain their contact between any two neighboring filter media layers even under hydrodynamic interactions of through fuel-water blend flow, the above four layers of fibrous filter media are retained a coalescer element based on the above pleated media block are shown in Table 7, and a summary of the water removal test is listed in Table 8.

TABLE 7

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

TABLE 8

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.79 | 21.05 | F.T. 64.0° F.; R.T. 65.8° F.; R.H. 47.0%; ΔP 4 PSID |
| Average | 2.0 | 1.33 | 21.00 | F.T. 64.0° F.; R.T. 66.5° F.; R.H. 47.0%; ΔP 4 PSID |
| Average | 4.3 | 0.61 | 40.32 | F.T. 64.0° F.; R.T. 67.3° F.; R.H. 46.0%; ΔP 9 PSID |
| Average | 4.1 | 1.30 | 74.64 | F.T. 64.0° F.; R.T. 67.6° F.; R.H. 46.0%; ΔP 10 PSID |
| Average | 6.4 | 0.76 | 121.03 | F.T. 70.0° F.; R.T. 71.2° F.; R.H. 43.0%; ΔP 11 PSID |
| Average | 6.3 | 1.06 | 125.07 | F.T. 70.0° F.; R.T. 71.6° F.; R.H. 42.0%; ΔP 12 PSID |
| Average | 8.0 | 0.66 | 189.52 | F.T. 72.0° F.; R.T. 72.3° F.; R.H. 41.0%; ΔP 14 PSID |
| Average | 8.0 | 1.01 | 219.52 | F.T. 72.0° F.; R.T. 72.7° F.; R.H. 41.0%; ΔP 14 PSID |

Notations
F.T.: Fuel Temperature
R.T.: Room Temperature
R.H.: Room Humidity
Δ P: Differential Pressure over Coalescer Element

ADDITIONAL EXAMPLE 4

Additional example four of new coalescence media 20 is made up of two types of fibrous filter media tightly stacked together. One type, at the flow upstream side, is a stack of four layers of non-woven fibrous filter media with three different media structures. More specifically, the first non-woven media layer is made of media 107, which is a laminated synthetic filter paper with both a Frazier air flow 11.0 CFM/SF @ ΔP ½" $H_2O$ and a DOP smoke penetration of 6.0% @ 32.0 liters/min., and the following two non-woven media layers are made of media 108, which is micro fiberglass media with an air permeability of 0.26 inches of water gauge and an ASHRAE efficiency (52.1) of 80.0-85.0%. The last non-woven media layer is made of media 85, which is micro fiberglass media with a mean flow pore size of 6.4 microns and a water repellency of 20.0 inches of Water Gauge. The other type, at the flow downstream side, is one layer of media 26, which is precisely woven hydrophilic monofilament mesh with an opening of 18.0 microns and a thread diameter of 31.0 microns. Furthermore, the above five layers of fibrous filter media are retained between two layers of steel mesh screen 80, 90 with different screen sizes, that is, 18.0×14.0 meshes per square inch with a wire diameter of 0.07 inches at the upstream and 10.0×12.0 meshes per square inch with a wire diameter of 0.10 inches at the downstream. Finally, all seven layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. The major design parameters of a coalescer element based on the above pleated media block are shown in Table 9, and a summary of the water removal test is listed in Table 10.

TABLE 9

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

TABLE 10

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.79 | 32.89 | F.T. 74.0° F.; R.T. 74.1° F.; R.H. 39.0%; ΔP 3 PSID |
| Average | 2.1 | 1.29 | 28.59 | F.T. 74.0° F.; R.T. 74.5° F.; R.H. 39.0%; ΔP 4 PSID |
| Average | 4.2 | 0.64 | 36.80 | F.T. 74.0° F.; R.T. 74.8° F.; R.H. 38.0%; ΔP 7 PSID |
| Average | 4.3 | 1.25 | 55.10 | F.T. 74.0° F.; R.T. 75.0° F.; R.H. 37.0%; ΔP 8 PSID |
| Average | 6.2 | 0.78 | 60.29 | F.T. 75.0° F.; R.T. 75.4° F.; R.H. 37.0%; ΔP 10 PSID |
| Average | 6.4 | 1.05 | 92.26 | F.T. 75.0° F.; R.T. 75.6° F.; R.H. 36.0%; ΔP 11 PSID |
| Average | 8.1 | 0.66 | 100.06 | F.T. 75.0° F.; R.T. 75.9° F.; R.H. 36.0%; ΔP 12 PSID |
| Average | 7.8 | 1.02 | 119.26 | F.T. 75.0° F.; R.T. 75.9° F.; R.H. 36.0%; ΔP 14 PSID |

Notations
F.T.: Fuel Temperature
R.T.: Room Temperature
R.H.: Room Humidity
Δ P: Differential Pressure over Coalescer Element

ADDITIONAL EXAMPLE 5

Additional example five of new pleated coalescence media 20 is made up of two types of fibrous filter media tightly stacked together. One type, at the flow upstream side, is a stack of two layers of non-woven fibrous media with different media structures. More specifically, the first non-woven media layer is made of media 109, which is non-woven nanofiber-based filter media with a mean flow pore size of less than 2.0 microns and a static electrokinetic potential in colloidal systems larger than 50.0 mV at 7.2 pH, and the following non-woven media layer is made of media 85, which is micro fiberglass filter media with a mean flow pore size of 6.4 micron and a water repellency of 20.0 inches of Water Gauge. The other type, at the flow downstream side, is a pile of two layers of media 26, which is precise-woven hydrophilic monofilament mesh with an opening of 18.0 microns and a thread diameter of 31.0 microns. Furthermore, the above four layers of fibrous filter media are retained between two layers of steel mesh screen 80, 90 with different sizes, that is, 18.0×14.0 meshes per square inch with a wire diameter of 0.07 inches at the upstream and 12.0×10.0 meshes per square inch with a wire diameter of 0.10 inches at the downstream. Finally, all six layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleat media block is from the inside to the outside. The major design parameters of a coalescer element based on the above pleat media block are shown in Table 11, and a summary of the water removal test is listed in Table 12.

TABLE 11

Major Design Parameters for the Coalescer Element

| | |
|---|---|
| Outer Diameter (O.D.) | 4.25" |
| Coalescer Element Length | 10.0" |
| End Caps and Seals | Aluminum Sheet End Caps and Rubber Gaskets |
| Support Jack | Aluminum Perforated Tube |
| Flow Direction | Inside to Outside |

ADDITIONAL EXAMPLE 6

Additional example six of new pleated coalescence media 20 is made up of two types of fibrous filter media tightly stacked together. One type, at the flow upstream side, is a stack of three layers of non-woven fibrous filter media with two different media structures. More specifically, the first non-woven media layer is made of media 109, which is non-woven nanofiber-based filter media with a mean flow pore size of less than 2.0 microns and a static electrokinetic potential in colloidal systems larger than 50.0 mV at 7.2 pH, and the following two non-woven media layers are made of media 21, which is micro fiberglass filter media with a mean flow pore size of 6.5 micron and a water repellency of 5.0 inches of Water Gauge. The other type, at the flow downstream side, is a pile of two layers of media 26, which is precisely woven hydrophilic monofilament mesh with an opening of 18.0 microns and a thread diameter of 31.0 microns. Furthermore, the above five layers of fibrous filter media are retained between two layers of steel mesh screen 80, 90 with different screen sizes, that is, 18.0×14.0 meshes per square inch with a wire diameter of 0.07 inches at the upstream and 12.0×10.0 meshes per square inch with a wire diameter of 0.10 inches at the downstream. Finally, all seven layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. The major design parameters of a coalescer element based on the above pleated media block are shown in Table 13, and a summary of the water removal test is listed in Table 14.

TABLE 13

Major Design Parameters for the Coalescer Element

| | |
|---|---|
| Outer Diameter (O.D.) | 4.25" |
| Coalescer Element Length | 10.0" |
| End Caps and Seals | Aluminum Sheet End Caps and Rubber Gaskets |

TABLE 12

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.78 | 88.53 | F.T. 72.0° F.; R.T. 73.0° F.; R.H. 36.0%; ΔP 13 PSID |
| Average | 2.1 | 1.26 | 141.52 | F.T. 74.0° F.; R.T. 73.2° F.; R.H. 36.0%; ΔP 14 PSID |
| Average | 4.2 | 0.64 | 144.60 | F.T. 74.0° F.; R.T. 74.1° F.; R.H. 35.0%; ΔP 19 PSID |
| Average | 4.3 | 1.23 | 305.43 | F.T. 74.0° F.; R.T. 74.1° F.; R.H. 35.0%; ΔP 20 PSID |
| Average | 6.2 | 0.77 | 141.65 | F.T. 75.0° F.; R.T. 74.7° F.; R.H. 35.0%; ΔP 24 PSID |
| Average | 6.3 | 1.05 | 417.84 | F.T. 75.0° F.; R.T. 74.7° F.; R.H. 35.0%; ΔP 26 PSID |

Notations
F.T.: Fuel Temperature
R.T.: Room Temperature
R.H.: Room Humidity
ΔP: Differential Pressure over Coalescer Element

TABLE 13-continued

Major Design Parameters for the Coalescer Element

| | |
|---|---|
| Support Jack | Aluminum Perforated Tube |
| Flow Direction | Inside to Outside |

TABLE 14

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.78 | 152.81 | F.T. 80.0° F.; R.T. 70.9° F.; R.H. 24.0%; ΔP 13 PSID |
| Average | 2.1 | 1.27 | 116.34 | F.T. 85.0° F.; R.T. 70.5° F.; R.H. 24.0%; ΔP 14 PSID |
| Average | 4.2 | 0.64 | 172.33 | F.T. 90.0° F.; R.T. 71.0° F.; R.H. 25.0%; ΔP 17 PSID |
| Average | 4.3 | 1.24 | 243.94 | F.T. 90.0° F.; R.T. 71.3° F.; R.H. 26.0%; ΔP 18 PSID |

Notations

F.T.: Fuel Temperature

R.T.: Room Temperature

R.H.: Room Humidity

ΔP: Differential Pressure over Coalescer Element

ADDITIONAL EXAMPLE 7

Additional example seven of new pleated coalescence media 20 is made up of two types of fibrous filter media tightly stacked together. One type, at the flow upstream side, is a stack of three layers of non-woven fibrous filter media with two different media structures. More specifically, the first non-woven media layer is made of media 109, which is non-woven nanofiber filter media with a mean flow pore size of less than 2.0 microns and a static electrokinetic potential in colloidal systems larger than 50.0 mV at 7.2 pH, and the following two non-woven layers are made of media 85, which is micro fiberglass filter media with a mean flow pore size of 6.4 micron and a water repellency of 20.0 inches of Water Gauge. The other type, at the flow downstream side, is a pile of two layers of media 26, which is precisely woven hydrophilic monofilament mesh with an opening of 18.0 microns and a thread diameter of 31.0 microns. Furthermore, the above five layers of fibrous filter media are retained between two layers of steel mesh screen 80, 90 with different screen sizes, that is 18.0×14.0 meshes per square inch with a wire diameter of 0.07 inches at the upstream and 12.0×10.0 meshes per square inch with a wire diameter of 0.10 inches at the downstream. Finally, all seven layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. The major design parameters of a coalescer element based on the above pleated media block are shown in Table 15, and a summary of the water removal test is listed in Table 16.

TABLE 15

Major Design Parameters for the Coalescer Element

| | |
|---|---|
| Outer Diameter (O.D.) | 4.25" |
| Coalescer Element Length | 10.0" |
| End Caps and Seals | Aluminum Sheet End Caps and Rubber Gaskets |
| Support Jack | Aluminum Perforated Tube |
| Flow Direction | Inside to Outside |

TABLE 16

Total Water Contents in No. 2 Petrodiesel at both Upstream and Downstream

|  | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.79 | 46.24 | F.T. 74.0° F.; R.T. 73.2° F.; R.H. 36.0%; ΔP 13 PSID |
| Average | 2.1 | 1.27 | 28.32 | F.T. 74.0° F.; R.T. 73.4° F.; R.H. 36.0%; ΔP 14 PSID |
| Average | 4.2 | 0.64 | 98.73 | F.T. 74.0° F.; R.T. 74.1° F.; R.H. 35.0%; ΔP 20 PSID |
| Average | 4.3 | 1.24 | 106.75 | F.T. 74.0° F.; R.T. 74.1° F.; R.H. 35.0%; ΔP 22 PSID |
| Average | 6.2 | 0.78 | 206.96 | F.T. 74.0° F.; R.T. 74.7° F.; R.H. 35.0%; ΔP 26 PSID |
| Average | 6.3 | 1.06 | 279.67 | F.T. 74.0° F.; R.T. 74.7° F.; R.H. 35.0%; ΔP 28 PSID |

Notations
F.T.: Fuel Temperature
R.T.: Room Temperature
R.H.: Room Humidity
ΔP: Differential Pressure over Coalescer Element

ADDITIONAL EXAMPLE 8

Additional example eight of new pleated coalescence media 20 is made up of two types of fibrous filter media tightly stacked together. One type, at the flow upstream side, is a stack of four layers of non-woven micro fiberglass filter media with two different media structures. More specifically, the first two non-woven media layers are made of media 21, which is non-woven micro fiberglass filter media with a mean flow pore size of 6.5 microns and a water repellency of 5.0 inches of Water Gauge, and the following two non-woven media layers are made of media 85, which is non-woven micro fiberglass filter media with a mean flow pore size of 6.4 microns and a water repellency of 20.0 inches of Water Gauge. The other type, at the flow downstream side, is a pile of two layers of media 110, which is precisely woven polyamide monofilament mesh with an opening of 55.0 microns and a thread diameter of 30.0 microns. Furthermore, the above six layers of fibrous filter media are retained between two layers of steel mesh screen 80, 90 with different screen sizes, that is, 18.0×14.0 meshes per square inch with a wire diameter of 0.07 inches at the upstream and 12.0×10.0 meshes per square inch with a wire diameter of 0.10 inches at the downstream. Finally, all eight layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. The major design parameters of a coalescer element based on the above pleated media block are shown in Table 17, and a summary of the water removal test is listed in Table 18.

TABLE 17

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

TABLE 18

Total Water Contents in No. 2 Petrodiesel at both Upstream and Downstream

|  | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.79 | 56.17 | F.T. 82.0° F.; R.T. 80.8° F.; R.H. 47.0%; ΔP 6 PSID |
| Average | 2.0 | 1.33 | 67.44 | F.T. 82.0° F.; R.T. 81.3° F.; R.H .46.0%; ΔP 6 PSID |
| Average | 4.3 | 0.62 | 74.91 | F.T. 82.0° F.; R.T. 80.6° F.; R.H. 47.0%; ΔP 10 PSID |
| Average | 4.3 | 1.24 | 72.28 | F.T. 82.0° F.; R.T. 80.4° F.; R.H. 47.0%; ΔP 10 PSID |
| Average | 6.4 | 0.75 | 62.50 | F.T. 82.0° F.; R.T. 80.2° F.; R.H. 48.0%; ΔP 12 PSID |
| Average | 6.4 | 1.04 | 93.27 | F.T. 82.0° F.; R.T. 80.4° F.; R.H. 48.0%; ΔP 14 PSID |
| Average | 8.1 | 0.66 | 86.78 | F.T. 82.0° F.; R.T. 79.5° F.; R.H. 52.0%; ΔP 16 PSID |
| Average | 8.1 | 0.99 | 79.63 | F.T. 82.0° F.; R.T. 79.5° F.; R.H. 51.0%; ΔP 16 PSID |

Notations
F.T.: Fuel Temperature
R.T.: Room Temperature
R.H.: Room Humidity
Δ P: Differential Pressure over Coalescer Element

ADDITIONAL EXAMPLE 9

Additional example nine of new pleat coalescence media 20 is made up of two types of fibrous filter media tightly stacked together. One type, at the flow upstream side, is a stack of four layers of non-woven micro fiberglass media with two different media structures. More specifically, the first two non-woven media layers are made of media 21, which is non-woven micro fiberglass filter media with a mean flow pore size of 6.5 microns and a water repellency of 5.0 inches of Water Gauge, and the following two layers are made of media 85, which is non-woven micro fiberglass filter media with a mean flow pore size of 6.4 micron and a water repellency of 20.0 inches of Water Gauge. The other type, at the flow downstream side, is a pile of two layers of media 111, which is precisely woven hydrophilic monofilament mesh with an opening of 47.0 microns and a thread diameter of 34.0 microns. Furthermore, the above six layers of fibrous filter media are retained between two layers of steel mesh screen 80, 90 with different screen sizes, that is, 18.0×14.0 meshes per square inch with a wire diameter of 0.07 inches at the upstream and 12.0×10.0 meshes per square inch with a wire diameter of 0.10 inches. Finally, all eight layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. The major design parameters of a coalesces element based on the above pleated media block are shown in Table 19, and a summary of the water removal test is listed in Table 20.

TABLE 19

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

ADDITIONAL EXAMPLE 10

Additional example ten of new pleat coalescence media 20 is made up of two types of fibrous filter media tightly stacked together. One type, at the flow upstream side, is a stack of three layers of non-woven micro fiberglass filter media with two different media structures. More specifically, the first non-woven media layer is made of media 21, which is non-woven micro fiberglass filter media with a mean flow pore size of 6.5 micron and a water repellency of 5.0 inches of Water Gauge, and the following two non-woven media layers are made of media 85, which is non-woven micro fiberglass filter media with a mean flow pore size of 6.4 micron and a water repellency of 20.0 inches of Water Gauge. The other type, at the flow downstream side, is one layer of media 112, which is precisely woven polyamide monofilament mesh with an opening of 32.0 microns and a thread diameter of 35.0 microns. Furthermore, the above four layers of fibrous filter media are retained between two layers of steel mesh screen 80, 90 with different screen sizes, that is, 18.0×14.0 meshes per square inch with a wire diameter of 0.07 inches at the upstream side and 12.0×10.0 meshes per square inch with a wire diameter of 0.10 inches at the downstream side. Finally, all six layers of both fibrous filter media and steel mesh screens are pleated as a cylindrical media block, and one 2.0 inch polyethylene porous pipe 2 with a wall thickness of schedule 40 and a pore size of 20.0-40.0 microns is located at the center of the cylindrical media block to homogeneously distribute incoming fuel-water blend flow over its inner filter media surface. The fuel-water blend flow direction through the above pleated media block is from the inside to the outside. Major design parameters of a coalescer element based on the above pleated media block are shown in Table 21, and a summary of the water removal test is listed in Table 22.

TABLE 21

Major Design Parameters for the Coalescer Element

| | |
|---|---|
| Outer Diameter (O.D.) | 4.25" |
| Coalescer Element Length | 12.0" |
| End Caps and Seals | Aluminum Sheet End Caps and Rubber Gaskets |
| Support Jack | Aluminum Perforated Tube |
| Flow Direction | Inside to Outside |

TABLE 20

Total Water Contents in No. 2 Petrodiesel at both Upstream and Downstream

| | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.80 | 59.28 | F.T. 73.0° F.; R.T. 74.5° F.; R.H. 39.0%; ΔP 4 PSID |
| Average | 2.0 | 1.33 | 61.83 | F.T. 74.0° F.; R.T. 75.2° F.; R.H 40.0%; ΔP 4 PSID |
| Average | 4.2 | 0.64 | 76.36 | F.T. 77.0° F.; R.T. 77.4° F.; R.H. 25.0%; ΔP 8 PSID |
| Average | 4.2 | 1.31 | 64.47 | F.T. 73.0° F.; R.T. 74.5° F.; R.H. 25.0%; ΔP 9 PSID |
| Average | 6.0 | 0.80 | 81.63 | F.T. 77.0° F.; R.T. 76.8° F.; R.H. 25.0%; ΔP 11 PSID |
| Average | 6.0 | 1.09 | 76.80 | F.T. 77.0° F.; R.T. 77.0° F.; R.H. 25.0%; ΔP 11 PSID |
| Average | 8.0 | 0.66 | 92.27 | F.T. 77.0° F.; R.T. 76.6° F.; R.H. 26.0%; ΔP 13 PSID |
| Average | 8.0 | 0.97 | 89.97 | F.T. 77.0° F.; R.T. 76.8° F.; R.H. 25.0%; ΔP 13 PSID |

Notations

F.T.: Fuel Temperature

R.T.: Room Temperature

R.H.: Room Humidity

Δ P: Differential Pressure over Coalescer Element

TABLE 22

Total Water Contents in No. 2 Petrodiesel at both Upstream and Downstream

|  | Fuel-Water Flow Rates @ Upstream (GPM) | Water Contents @ Upstream (%) | Water Contents @ Downstream (PPM) | Average Test Conditions During Sampling Period |
|---|---|---|---|---|
| Average | 2.0 | 0.78 | 84.36 | F.T. 80.0° F.; R.T. 80.2° F.; R.H. 53.0%; ΔP 2 PSID |
| Average | 2.0 | 1.31 | 57.50 | F.T. 80.0° F.; R.T. 80.0° F.; R.H 54.0%; ΔP 2 PSID |
| Average | 4.1 | 0.65 | 126.75 | F.T. 80.0° F.; R.T. 80.1° F.; R.H. 52.0%; ΔP 6 PSID |
| Average | 4.1 | 1.30 | 109.97 | F.T. 80.0° F.; R.T. 80.2° F.; R.H. 53.0%; ΔP 6 PSID |
| Average | 6.3 | 0.77 | 158.74 | F.T. 80.0° F.; R.T. 79.5° F.; R.H. 57.0%; ΔP 8 PSID |
| Average | 6.3 | 1.08 | 149.67 | F.T. 80.0° F.; R.T. 79.7° F.; R.H. 55.0%; ΔP 8 PSID |
| Average | 8.3 | 0.64 | 183.99 | F.T. 80.0° F.; R.T. 79.2° F.; R.H. 61.0%; ΔP 10 PSID |
| Average | 8.3 | 0.97 | 222.94 | F.T. 80.0° F.; R.T. 79.3° F.; R.H. 61.0%; ΔP 10 PSID |

Notations
F.T.: Fuel Temperature
R.T.: Room Temperature
R.H.: Room Humidity
Δ P: Differential Pressure over Coalescer Element The coalescer elements 1-1d, as well as the various examples set forth above, achieve unexpected, extraordinary effectiveness and efficiency in removing dispersed contaminant water particles from fuels and other oil based industrial liquids, even those having a very high water content and/or including large quantities of surfactants, or other similar chemicals. For example, coalescer elements 1-1d embodying the present invention, which are around 20 percent smaller than prior art coalescers, can remove as much or more dispersed contaminant water particles from an oil based industrial liquid having an initial 6,000.0-100,000.0 ppm or 0.6-10.0 percent water content in a single pass without clogging or causing a significant resistance in flow, thereby representing a significant improvement in the art of liquid/liquid filtration. For similarly sized and configured coalescer elements, coalescer elements 1-1d achieve around 20.0-30.0 percent more coalescence of dispersed contaminant water particles than comparable prior art coalescers.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. An apparatus for removing contaminants from liquid fuels, lubricants and other oil based industrial liquids of the type having a particulate filter configured for removing solid contaminants from a selected oil based industrial liquid, a water coalescer positioned downstream of said particulate filter and configured for removing dispersed contaminant liquid water particles from the oil based industrial liquid, and a pump configured for sequentially flowing the oil based industrial liquid through said particulate filter and said water coalescer, the improvement of a liquid/liquid coalescer element for said water coalescer, comprising:

a porous support tube having a hollow interior, a radially oriented exterior surface, a radially oriented interior surface, and a permeable sidewall through which an oil based industrial liquid flows in an inside out direction from said interior surface to said exterior surface; and a coalescer pleat block having a hollow interior, a radially oriented exterior surface, and a radially oriented interior surface overlying said exterior surface of said support tube, and including a plurality of individual pleats arranged side-by-side and formed from an integrated, multilayer coalescence media, comprising:

at least one layer of non-woven fibrous material that is partially wettable by the dispersed contaminant liquid water particles in the oil based industrial liquid, having a downstream face, an oppositely disposed upstream face disposed adjacent to said exterior surface of said support tube, and a predetermined thickness, mean flow pore size, hydrophilic level and stiffness sufficient to commence coalescence of the dispersed contaminant liquid water particles in the incoming oil based industrial fluid as the same flows therethrough and thereby form a plurality of relatively small primary water droplets; and at least one sheet of precisely woven monofilament fabric that is substantially completely wettable by the dispersed contaminant liquid water particles in the oil based industrial liquid, having a downstream face, an oppositely disposed upstream face abuttingly overlying said downstream face of said layer of non-woven fibrous material, and a fixed open mesh with uniformly sized and spaced apart pore openings, and a predetermined mean flow pore size and hydrophilic level sufficient to continue coalescence of the dispersed contaminant water particles in the incoming oil based industrial liquid in a manner such that as the oil based industrial liquid passes through said pleat block, said primary water droplets flow in a generally uniform pattern from said downstream face of said layer of non-woven fibrous material onto said upstream face of said sheet of precisely woven monofilament fiber, attach to the monofilament fibers of said open mesh due to strong droplet wettability over the same, and while so attached, experience bidirectional hydrodynamic interactions with adjacent primary water droplets and the oil based industrial liquid flowing therethrough which cause said primary water droplets to deform and reflow on said sheet of precisely woven monofilament fiber, thereby growing the same in size into relatively large secondary water droplets, which are in turn distributed in a generally homogeneous spatial relationship across said downstream face of said sheet of precisely woven monofilament fiber, and continue to grow in size thereon through reflowing and/or colliding with other primary and/or secondary water droplets into relatively large water drops having a size sufficient that the viscous drag forces of the oil based industrial liquid flowing through said coalescer element cause said large water drops to release from said downstream face of said precisely woven monofilament fabric and fall downwardly under gravitational forces from said pleat block for collection adjacent a bottom portion of said coalescer element, wherein said sheet of precisely woven monofilament fabric is constructed from a material with hydrophilic fiber surfaces having a degree of fabric wettability in the range of 0,0-90.0 degrees contact angle;

wherein said sheet of precisely woven monofilament fabric is constructed of fixedly interconnected threads having a diameter in the range of 5.0-100.0 microns;

said pore openings in said sheet of precisely woven monofilament fabric having an average size in the range of 5.0-150.0 microns;

wherein said multilayer coalescence media includes a plurality of sheets of said precisely woven monofilament fabric arranged with adjacent faces thereof overlying each other in a tight stack, whereby said bidirectional hydrodynamic interactions of said primary water droplets with adjacent primary water droplets and the oil based industrial liquid take place both across said faces of said sheets in a direction generally normal to the direction of flow of the oil based industrial fluid, and through said stack of said sheets in a direction generally parallel to the direction of flow of the oil based industrial fluid;

wherein said support tube is partially wettable by the dispersed contaminant water particles in the oil based industrial fluid to ensure substantially homogeneous distribution of the oil based industrial liquid onto said upstream face of said coalescer pleat block;

said pleat block including a first porous support layer having sufficient rigidity to support at least a portion of said pleat block, with a downstream face overlying said upstream face of said layer of non-woven fibrous material and an upstream face exposed to the incoming oil based industrial liquid, said pleat block further including a second porous support layer having sufficient rigidity to support at least a portion of said pleat block, with a downstream face and an oppositely disposed upstream face overlying said downstream face of said sheet of precisely woven monofilament fiber; and wherein said coalescer element includes a rigid support jacket having a hollow interior in which said pleat block is closely received, a radially oriented interior surface abutting said downstream face of said second porous support layer, and a perforate sidewall through which the oil based industrial liquid flows.

2. An apparatus as set forth in claim 1, wherein:

said at least one layer of non-woven fibrous material comprises upstream and downstream layers of non-woven fibrous material disposed in an overlying, tightly stacked relationship; and said upstream layer of non-woven fibrous material has a water repellency in the range of 3.0-30.0 inches of Water Gauge per test standard MIL-STD-282.

3. An apparatus as set forth in claim 2, wherein:

at least one of said sheets of non-woven fibrous material has a basis weight in the range of 25.0-100.0 lbs./ft.$^2$ and a thickness in the range of 10.0-30.0 mils.

4. An apparatus as set forth in claim 3, wherein:

at least one of said sheets of non-woven fibrous material has a mean flow pore size in the range of 0.5-8.0 microns and a stiffness in the range of 1000.0-3000.0 mgs.

* * * * *